(12) United States Patent
Koreeda et al.

(10) Patent No.: US 8,068,401 B2
(45) Date of Patent: Nov. 29, 2011

(54) OBJECTIVE OPTICAL SYSTEM AND OPTICAL INFORMATION RECORDING/REPRODUCING DEVICE HAVING THE SAME

(75) Inventors: Daisuke Koreeda, Saitama (JP); Shuichi Takeuchi, Saitama (JP); Yoshiyuki Tashiro, Kanagawa (JP)

(73) Assignee: Hoya Corporation, Tokyo (JP)

( * ) Notice: Subject to any disclaimer, the term of this patent is extended or adjusted under 35 U.S.C. 154(b) by 366 days.

(21) Appl. No.: 12/357,462

(22) Filed: Jan. 22, 2009

(65) Prior Publication Data

US 2009/0185472 A1   Jul. 23, 2009

(30) Foreign Application Priority Data

Jan. 22, 2008   (JP) .................................. 2008-011493
Oct. 6, 2008    (JP) .................................. 2008-259796

(51) Int. Cl.
*G11B 7/00* (2006.01)
(52) U.S. Cl. .............................. 369/112.23; 369/112.08
(58) Field of Classification Search ............. 369/112.23, 369/112.08
See application file for complete search history.

(56) References Cited

U.S. PATENT DOCUMENTS

| | | |
|---|---|---|
| 2005/0122882 A1 | 6/2005 | Kimura |
| 2005/0265151 A1 | 12/2005 | Kimura et al. |
| 2006/0023611 A1 | 2/2006 | Wachi et al. |
| 2006/0077792 A1 | 4/2006 | Kimura et al. |
| 2006/0077793 A1 | 4/2006 | Kimura et al. |
| 2007/0014211 A1 | 1/2007 | Koreeda et al. |
| 2007/0070860 A1 | 3/2007 | Koreeda et al. |
| 2007/0286054 A1 | 12/2007 | Koizumi et al. |
| 2007/0297314 A1 | 12/2007 | Koreeda et al. |
| 2008/0130465 A1 | 6/2008 | Koreeda et al. |
| 2009/0052307 A1 | 2/2009 | Tashiro et al. |
| 2009/0080319 A1 | 3/2009 | Koreeda et al. |

FOREIGN PATENT DOCUMENTS

| | | |
|---|---|---|
| JP | 2006-012394 A | 1/2006 |
| JP | 2006-134366 A | 5/2006 |
| JP | 2006-164498 A | 6/2006 |

OTHER PUBLICATIONS

English language Abstract of JP 2006-164498 A.
English language Abstract of JP 2006-134366 A.
English language Abstract of JP 2006-012394 A.

*Primary Examiner* — Van Chow
(74) *Attorney, Agent, or Firm* — Greenblum & Bernstein, PLC

(57) ABSTRACT

There is provided an objective optical system used for information recording/reproducing for three types of optical discs. The objective optical system includes an objective lens, and a diffraction structure formed on an optical surface. The diffraction structure includes a first area for contributing to converging the third light beam. The first area includes first and second steps defined by first and second optical path difference functions, respectively. The first step is configured such that diffraction orders at which diffraction efficiencies for the first, second and third light beams are maximized are $1^{st}$ order, 0-th order and 0-th order, respectively. The first step satisfies a condition:

$$-0.36\times10^2 < P_{12} \times f1 + 5.0\times10^3 \times (n1-n3) < 1.80\times10^2 \qquad (1)$$

The second step is configured such that diffraction orders at which diffraction efficiencies for the first, second and third light beams are maximized are $2^{nd}$ order, $1^{st}$ order and $1^{st}$ order, respectively.

20 Claims, 11 Drawing Sheets

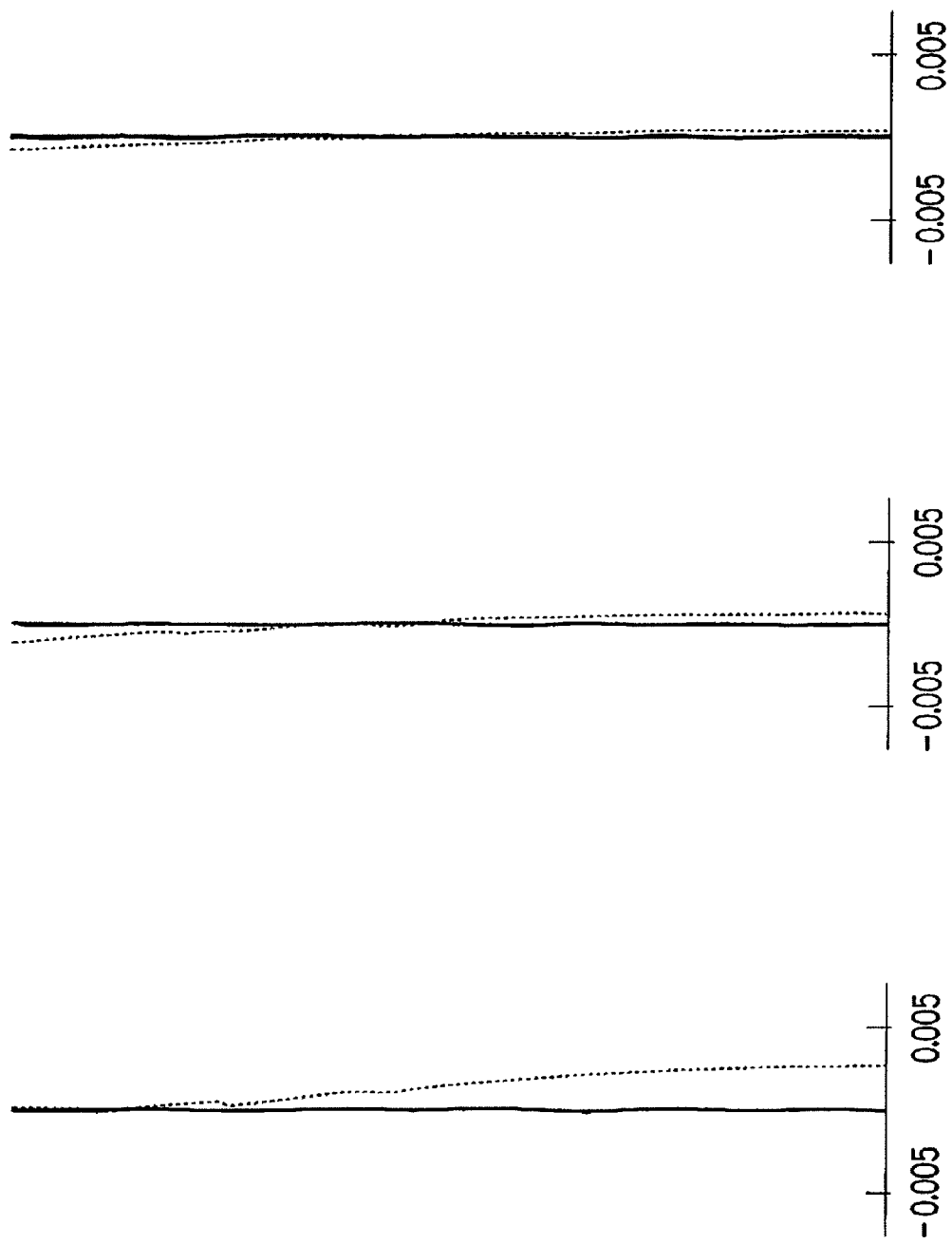

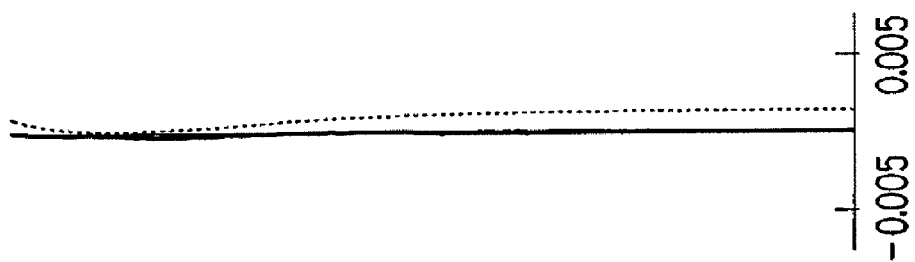
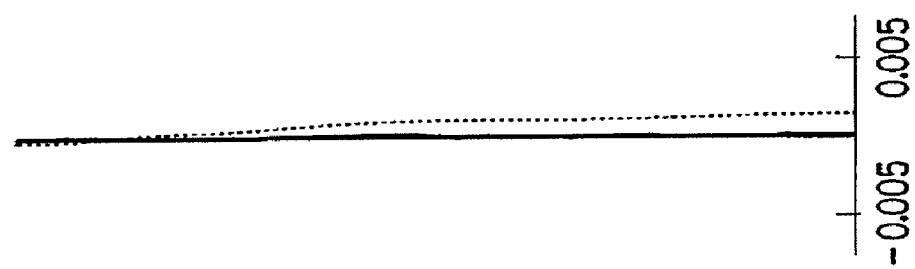
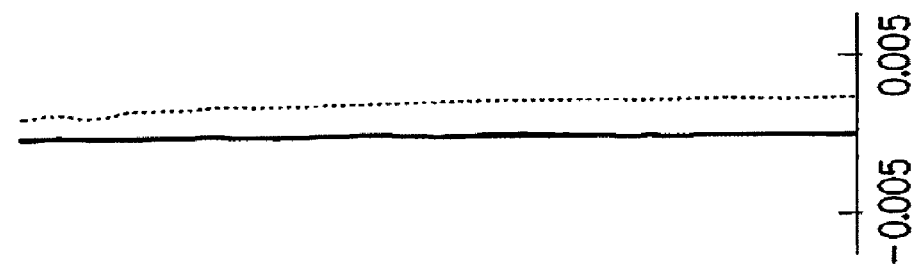

OBJECTIVE OPTICAL SYSTEM AND OPTICAL INFORMATION RECORDING/REPRODUCING DEVICE HAVING THE SAME

BACKGROUND OF THE INVENTION

The present invention relates to an objective optical system which is installed in a device employing multiple types of light beams having different wavelengths, such as an optical information recording/reproducing device for recording information to and/or reproducing information from multiple types of optical discs differing in recording density.

There exist various standards of optical discs (CD, DVD, etc.) differing in recording density, protective layer thickness, etc. Meanwhile, new-standard optical discs (HD DVD (High-Definition DVD), BD (Blu-ray Disc), etc.), having still higher recording density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective optical systems installed in the devices) of recent years are required to have compatibility with the above three types of optical discs. Incidentally, in this specification, the "optical information recording/reproducing devices" include devices for both information reproducing and information recording, devices exclusively for information reproducing, and devices exclusively for information recording. The above "compatibility" means that the optical information recording/reproducing device ensures the information reproducing and/or information recording with no need of component replacement even when the optical disc being used is switched.

In order to provide an optical information recording/reproducing device having the compatibility with optical discs of multiple standards, the device has to be configured to be capable of forming a beam spot suitable for a particular recording density of an optical disc being used, by changing a NA (Numerical Aperture) of an objective optical system used for information reproducing/registering, while also correcting spherical aberration which varies depending on the protective layer thickness changed by switching between optical discs of different standards. Since the diameter of the beam spot can generally be made smaller as the wavelength of the beam gets shorter, multiple laser beams having different wavelengths are selectively used by the optical information recording/reproducing device depending on the recording density of the optical disc being used. For example, for DVDs, a laser beam with a wavelength of approximately 660 nm (so-called red laser light) shorter than approximately 790 nm for CDs (so-called near-infrared laser light) is used. For the aforementioned new-standard optical discs, a laser beam (e.g., so-called "blue laser" around 408 nm) with a wavelength still shorter than that for DVDs is used in order to deal with the extra-high recording density.

Examples of objective optical systems for suitably converging the multiple types of light beams onto respective ones of the multiple types of optical discs are disclosed in Japanese Patent Provisional Publication Nos. 2006-164498A (hereafter, referred to as document #1), 2006-134366A (hereafter, referred to as document #2) and 2006-12394A (hereafter, referred to as document #3).

The objective optical system disclosed in document #1 is configured such that at least one of optical surfaces of an objective lens and an optical element located on the front side of the objective lens is provided with a diffraction surface. The diffraction surface is configured such that the diffraction order at which the diffraction efficiency is maximized for the blue laser light is an even order. Each of the blue laser and the red laser is incident on the objective optical system as a collimated beam, and the near-infrared light is incident on the objective optical system as a non-collimated beam (a diverging beam). As described above, the objective optical system disclosed in document #1 achieves the compatibility with the multiple types of optical discs by appropriately selecting the diffraction effect and the degree of divergence of a light beam.

The objective optical system disclosed in document #2 has an objective optical element and a temperature compensation element. The objective optical element is provided with a plurality of types of diffraction surfaces. By this structure, the objective optical system achieves both of the compatibility with the multiple types of optical discs including the high density optical disc (e.g., HD DVD) and the temperature compensation. In contrast to the objective optical system disclosed in document #1, each of the blue laser light, the red laser light and the infra-red laser light is incident on the objective optical system as a substantially collimated beam.

Document #3 discloses an objective optical system including an objective lens or an optical element which is formed of two types of elements made of different types of materials joined together. The objective lens or the optical element is provided with a diffraction structure on a joint surface. The structure of the objective optical system of document #3 aims to achieve the high level of use efficiency of light for all of the multiple types of laser beams through utilization of the diffraction effect and the difference between refractive indexes of the materials.

However, the objective optical systems disclosed in document #1-#3 have the following drawbacks. The objective optical system disclosed in document #1 employs the diffraction structure configured such that the diffraction order at which the diffraction efficiency is maximized for the blue laser is an even order. Therefore, for at least one of the multiple types of laser beams, it is necessary to enter the laser beam to the objective optical system as a non-collimated laser beam. If a non-collimated laser beam is incident on the objective optical system, off-axis aberrations, such as a coma, may occur when an objective lens shifts in a plane perpendicular to an optical axis of the objective lens for a tracking operation.

In the objective optical system disclosed in document #2, each of the blue laser, the red laser, the near-infrared laser is incident on the objective optical system as a collimated beam. Therefore, occurrence of off-axis aberrations (e.g., a coma) can be suppressed. However, when such a configuration where each of the multiple types of laser beams is incident on the objective optical system as a collimated beam is adopted, the diffraction efficiency may decrease for at least one of the multiple types of laser beams depending on the relationship between the wavelength of each laser beam and the diffraction effect.

The protective layer of CD is thicker than those of the other types of optical discs. Therefore, when CD is used, a working distance between a record surface of the optical disc and a surface of the objective lens adjacent to the record surface becomes short relative to the working distance defined for the other types of optical discs. Therefore, when CD is used, it is required to lengthen the back focus of the objective optical system to secure an adequate working distance. However, in the objective optical system of document #2, each of the multiple types of laser beams is incident on the objective optical system as a collimated beam. In this case, the back focus of the objective optical system becomes shorter relative to a configuration where a diverging beam is incident on the objective optical system. Therefore, if the configuration of document #2 is adopted, a possibility that the objective lens contacts the optical disc (CD) arises.

The configuration of the objective optical system of document #3 requires additional manufacturing processes for joining different materials together and for appropriately forming the diffraction structure on the joint surface, and such additional manufacturing processes are required to be performed with a high degree of accuracy. As a result, manufacturing cost increases.

SUMMARY OF THE INVENTION

The present invention is advantageous in that it provides at least one of an objective optical system and an optical information recording/reproducing device configured to have compatibility with multiple types of optical discs of different standards, to allow each of multiple types of laser beams to be incident on the corresponding one of the optical discs as a collimated beam, to secure an adequate back focus for each of the multiple types of optical discs, to achieve a high degree of use efficiency of light for each of the multiple types of optical discs while preventing occurrence of off-axis aberrations during the tracking operation, and further to be manufactured easily and at low cost.

According to an aspect of the invention, there is provided an objective optical system used for an optical information recording/reproducing device for recording information to and/or reproducing information from three types of optical discs, by selectively using one of three types of substantially collimated light beams including a first light beam having a first wavelength $\lambda_1$ (nm), a second light beam having a second wavelength $\lambda_2$ (nm) and a third light beam having a third wavelength $\lambda_3$ (nm). The three types of optical discs includes a first optical disc for which information recording or information reproducing is executed by using the first light beam, a second optical disc for which information recording or information reproducing is executed by using the second light beam, and a third optical disc for which information recording or information reproducing is executed by using the third light beam. The first, second and third wavelengths $\lambda_1$, $\lambda_2$, $\lambda_3$ satisfies a condition: $\lambda_1<\lambda_2<\lambda_3$. When protective layer thicknesses of the first, second and third optical discs are represented by t1 (mm), t2 (mm) and t3 (mm), respectively, the protective layer thicknesses satisfies following relationships: t1<t2<t3; and t3−t1≧1.0 (mm). When numerical apertures required for information reproducing or information recording on the first, second and third optical discs are defined as NA1, NA2 and NA3, respectively, the numerical apertures satisfy a relationship NA1>NA2>NA3.

In this configuration, the objective optical system includes an objective lens, and a diffraction structure formed on an optical surface in the objective optical system. The diffraction structure is defined by a following optical path difference function $\phi i(h)$:

$$\phi i(h)=(P_{i2}\times h^2+P_{i4}\times h^4+P_{i6}\times h^6+P_{i8}\times h^8+P_{i10}\times h^{10}+P_{i12}\times h^{12})m_i\lambda$$

where $P_{i2}$, $P_{i4}$, $P_{i6}$ ... (i: natural number) represent coefficients of the $2^{nd}$ order, $4^{th}$ order, $6^{th}$ order, ... of i-th optical path difference function, h represents a height from the optical axis, $m_i$ represents a diffraction order at which diffraction efficiency for an incident beam is maximized, and $\lambda$ represents a design wavelength of the incident beam. The diffraction structure includes a first area for contributing to converging the third light beam onto a record surface of the third optical disc. The first area includes a first step defined by a first optical path difference function and a second step defined by a second optical path difference function. The first step defined by the first optical path difference function is configured such that diffraction orders at which diffraction efficiencies for the first, second and third light beams are maximized are $1^{st}$ order, 0-th order and 0-th order, respectively. The first step defined by the first optical path difference function satisfies a condition:

$$-0.36\times10^2<P_{12}\times f1+5.0\times10^3\times(n1-n3)<1.80\times10^2 \quad (1)$$

where $P_{12}$ denotes a second order coefficient of the first optical path difference function, f1 denotes a total focal length of the objective optical system with respect to the first light beam, n1 denotes a refractive index of the objective lens with respect to the first light beam, and n3 denotes a refractive index of the objective lens with respect to the third light beam. The second step defined by the second optical path difference function being configured such that diffraction orders at which diffraction efficiencies for the first, second and third light beams are maximized are $2^{nd}$ order, $1^{st}$ order and $1^{st}$ order, respectively.

With this configuration, it becomes possible to secure a high use efficiency of light while suitably suppressing the spherical aberration for information recording and information reproducing for each of the three types of optical discs without using an expensive optical element, such as an optical element formed of two types of materials joined together, which requires a relatively complicated manufacturing process. In addition, it is possible to suitably correct the longitudinal chromatic aberration particularly for the first optical disc and to lengthen the back focus of the objective optical system during use of the third optical disc. Therefore, it is possible to secure an adequate working distance when the third optical disc is used.

In at least one aspect, the objective optical system includes an optical element separately provided with respect to the objective lens. In this case, at least one of surfaces of the objective lens and the optical element is formed as the optical surface having the diffraction structure.

In at least one aspect, at least one of surfaces of the objective lens is formed as the optical surface having the diffraction structure.

In at least one aspect, the first step defined by the first optical path difference function satisfies a condition:

$$0.12\times10^2<P_{12}\times f1+5.0\times10^3\times(n1-n3)<1.50\times10^2 \quad (2).$$

In at least one aspect, the diffraction structure is formed by combining at least two types of optical path difference functions including the first and second optical path difference functions such that the diffraction structure is formed on a same optical surface.

In at least one aspect, the diffraction structure includes a second area located outside the first area. In this case, the second area is configured to contribute to converging the first and second light beams onto record surfaces of the first and second optical discs, respectively, and not to contribute to converging the third light beam onto the record surface of the third optical disc. The second area is defined by at least a single type of optical path difference function. The second area is configured such that diffraction order at which diffraction efficiency for the first light beam is maximized is an odd order.

In at least one aspect, the second area is configured such that the diffraction order at which the diffraction efficiency for the first light beam is maximized is a $5^{th}$ order.

In at least one aspect, the second area is configured such that the diffraction order at which the diffraction efficiency for the first light beam is maximized is a $3^{rd}$ order.

In at least one aspect, the diffraction structure includes a third area located outside the second area. In this case, the third area is configured to contribute to converging the first light beam onto a record surface of the third optical disc and not to contribute to convergence of each of the second and third light beams. The third area is defined by at least a single type of optical path difference function. The third area is configured such that diffraction order at which diffraction efficiency for the first light beam is maximized is a $1^{st}$ order.

According to another aspect of the invention, there is provided an objective optical system used for an optical information recording/reproducing device for recording information to and/or reproducing information from three types of optical discs, by selectively using one of three types of substantially collimated light beams including a first light beam having a first wavelength $\lambda_1$ (nm), a second light beam having a second wavelength $\lambda_2$ (nm) and a third light beam having a third wavelength $\lambda_3$ (nm). The three types of optical discs includes a first optical disc for which information recording or information reproducing is executed by using the first light beam, a second optical disc for which information recording or information reproducing is executed by using the second light beam, and a third optical disc for which information recording or information reproducing is executed by using the third light beam. The first, second and third wavelengths $\lambda_1$, $\lambda_2$ and $\lambda_3$ satisfy a condition $\lambda_1 < \lambda_2 < \lambda_3$. When protective layer thicknesses of the first, second and third optical discs are represented by t1 (mm), t2 (mm) and t3 (mm), respectively, the protective layer thicknesses satisfy following relationships: t1<t2<t3; and t3−t1≧1.0 (mm). When numerical apertures required for information reproducing or information recording on the first, second and third optical discs are defined as NA1, NA2 and NA3, respectively, the numerical apertures satisfy a relationship: NA1>NA2>NA3.

In this configuration, The objective optical system includes an objective lens; and a phase shift structure which is formed on an optical surface in the objective optical system and includes a plurality of refractive surface zones concentrically formed about a predetermined axis. The phase shift structure includes a first phase shift structure having a first step and a second phase shift structure having a second step. Each of the first step and the second step gives an optical path length difference at a boundary between adjacent ones of the plurality of refractive surface zones. Optical path length differences given by the first and second steps are different from each other. The phase shift structure includes a first area for contributing to converging the third light beam onto a record surface of the third optical disc. In the first area, the phase shift structure satisfies following conditions:

$$-0.92 < \Delta OPD_{11}/\lambda 1 < -0.50 \quad (3);$$

$$-5.00 \times 10^2 < N_{11} \times f1 - 1.25 \times 10^4 (n1-n3) < -0.50 \times 10^2 \quad (4); \text{ and}$$

$$1.80 < |\Delta OPD_{21}/\lambda 1| < 2.20 \quad (5),$$

where $\Delta OPD_{11}/\lambda 1$ represents an optical path length difference given by the first step to the first light beam, $\Delta OPD_{21}/\lambda 1$ represents an optical path length difference given by the second step to the first light beam, $N_{11}$ represents a number of first steps, f1 denotes a total focal length of the objective optical system with respect to the first light beam, n1 denotes a refractive index of the objective lens with respect to the first light beam, and n3 denotes a refractive index of the objective lens with respect to the third light beam.

With this configuration, it becomes possible to secure a high use efficiency of light while suitably suppressing the spherical aberration for information recording and information reproducing for each of the three types of optical discs without using an expensive optical element, such as an optical element formed of two types of materials joined together, which requires a relatively complicated manufacturing process. In addition, it is possible to suitably correct the longitudinal chromatic aberration particularly for the first optical disc and to lengthen the back focus of the objective optical system during use of the third optical disc. Therefore, it is possible to secure an adequate working distance when the third optical disc is used.

In at least one aspect, the objective optical system including an optical element separately provided with respect to the objective lens. In this case, at least one of surfaces of the objective lens and the optical element is formed as the optical surface having the phase shift structure.

In at least one aspect, at least one of surfaces of the objective lens is formed as the optical surface having the phase shift structure.

In at least one aspect, the phase shift structure in the first area satisfies a condition:

$$-3.50 \times 10^2 < N_{11} \times f1 - 1.25 \times 10^4 (n1-n3) < -1.50 \times 10^2 \quad (6).$$

In at least one aspect, wherein the phase shift structure includes at least two types of steps including the first step and the second step such that the first and second steps are formed on a same optical surface.

In at least one aspect, the phase shift structure includes a second area located outside the first area. In this case, the second area is configured to contribute to converging the first and second light beams onto record surfaces of the first and second optical discs, respectively, and not to contribute to converging the third light beam onto the record surface of the third optical disc. The second area includes a step giving at least a single type of optical path length difference to an incident beam at a boundary between adjacent ones of the adjacent refractive surface zones. An absolute value of the at least a single type of optical path length difference given by the step in the second area is substantially equal to an odd multiple of the first wavelength $\lambda_1$ of the first light beam.

In at least one aspect, an absolute value of the at least a single type of optical path length difference given by the step in the second area is substantially equal to $5\lambda_1$.

In at least one aspect, an absolute value of the at least a single type of optical path length difference given by the step in the second area is substantially equal to $3\lambda_1$.

In at least one aspect, the phase shift structure includes a third area located outside the second area. In this case, the third area is configured to contribute to converging the first light beam onto a record surface of the third optical disc and not to contribute to converging each of the second and third light beams. The third area includes a step which is located at a boundary between adjacent ones of the plurality of refractive surface zones and give at least a single type of optical length difference to an incident beam. The at least a single type of optical length difference given by the step in the third area is substantially equal to $\lambda_1$.

According to another aspect of the invention, there is provided an optical information recording/reproducing device for recording information to and/or reproducing information from three types of optical discs. The optical information recording/reproducing device includes light sources that emits the first, second and third light beams, respectively, coupling lenses that converts the first, second and third light beams into substantially collimated beams, respectively, and one of the above described objective optical systems. The protective layer thicknesses being defined as t1≈0.1 mm, t2≈0.6 mm and t3≈1.2 mm.

With this configuration, it becomes possible to secure a high use efficiency of light while suitably suppressing the spherical aberration for information recording and information reproducing for each of the three types of optical discs without using an expensive optical element, such as an optical element formed of two types of materials joined together, which requires a relatively complicated manufacturing process. In addition, it is possible to suitably correct the longitudinal chromatic aberration particularly for the first optical disc and to lengthen the back focus of the objective optical system during use of the third optical disc. Therefore, it is possible to secure an adequate working distance when the third optical disc is used.

BRIEF DESCRIPTION OF THE ACCOMPANYING DRAWINGS

Figure 3A:
Figure 3B:
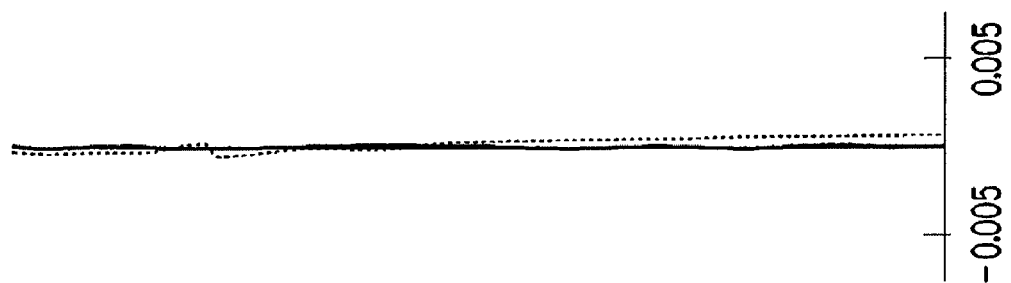
Figure 3C:
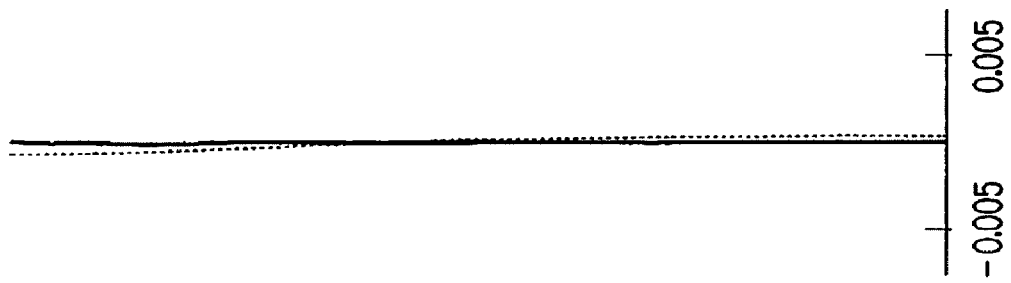

FIG. 3A is a graph illustrating the spherical aberration caused when the first laser beam is used in the optical information recording/reproducing device according to a first example, FIG. 3B is a graph illustrating the spherical aberration caused when the second laser beam is used in the optical information recording/reproducing device 100 according to the first example, and FIG. 3C is a graph illustrating the spherical aberration caused when the third laser beam is used in the optical information recording/reproducing device according to the first example.

FIG. 4A is a graph illustrating the spherical aberration caused when the first laser beam is used in the optical information recording/reproducing device according to a comparative example, FIG. 4B is a graph illustrating the spherical aberration caused when the second laser beam is used in the optical information recording/reproducing device according to the comparative example, and FIG. 4C is a graph illustrating the spherical aberration caused when the third laser beam is used in the optical information recording/reproducing device according to the comparative example.

Figure 5A:
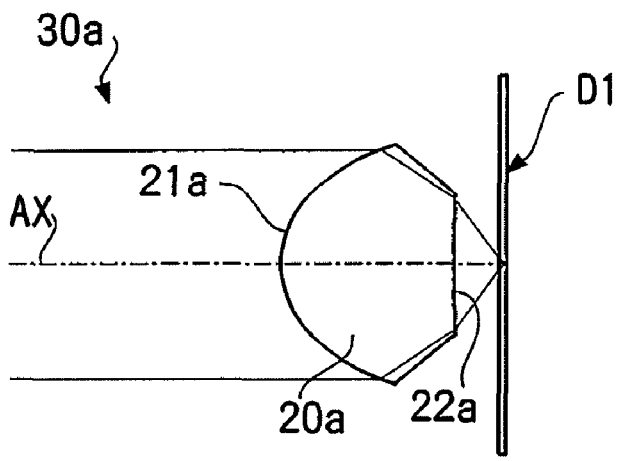
Figure 5B:
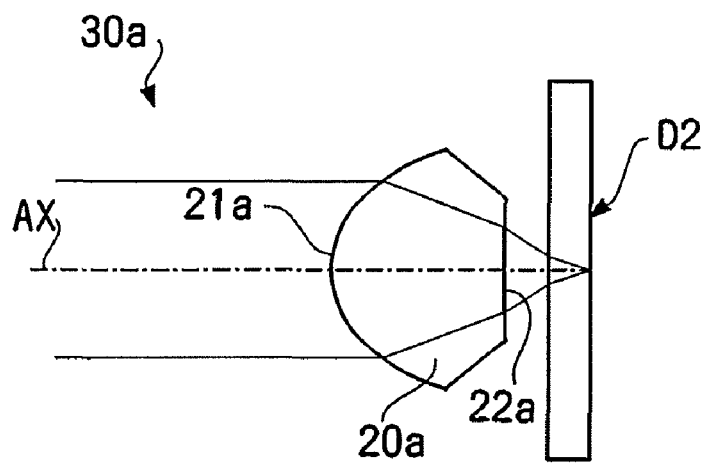
Figure 5C:
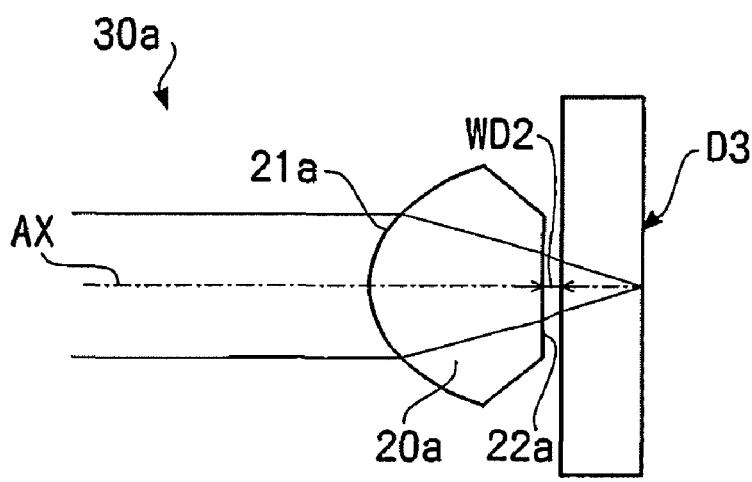

FIG. 5A shows a configuration of the objective optical system according to a second example defined when the first optical disc is used, FIG. 5B shows a configuration of the objective optical system defined when the second optical disc is used, and FIG. 5C shows a configuration of the objective optical system defined when the third optical disk is used.

Figure 6A:
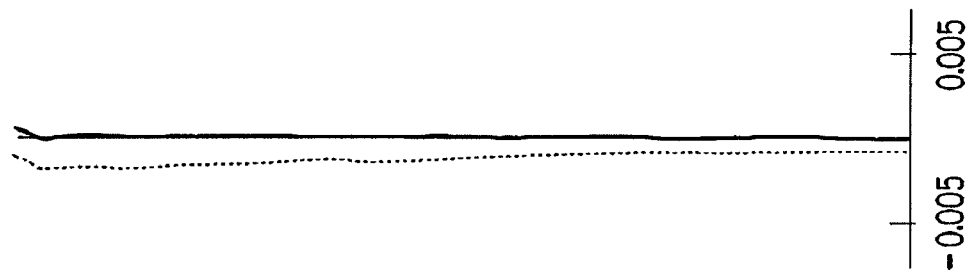
Figure 6B:
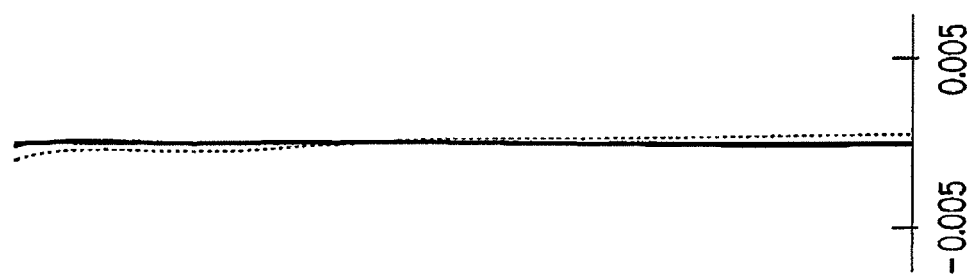
Figure 6C:
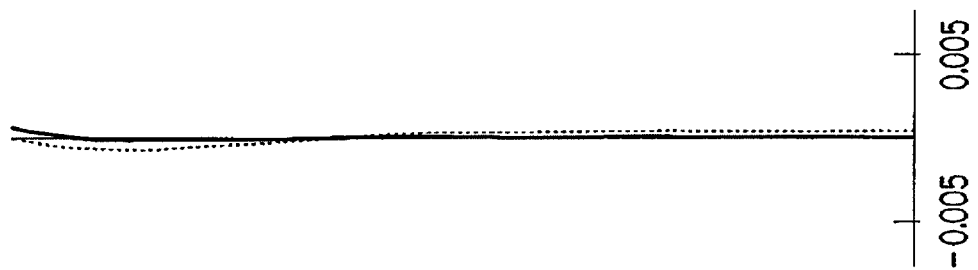

FIG. 6A is a graph illustrating the spherical aberration caused when the first laser beam is used in the optical information recording/reproducing device according to the second example, FIG. 6B is a graph illustrating the spherical aberration caused when the second laser beam is used in the optical information recording/reproducing device according to the second example, and FIG. 6C is a graph illustrating the spherical aberration caused when the third laser beam is used in the optical information recording/reproducing device according to the second example.

Figure 7A:
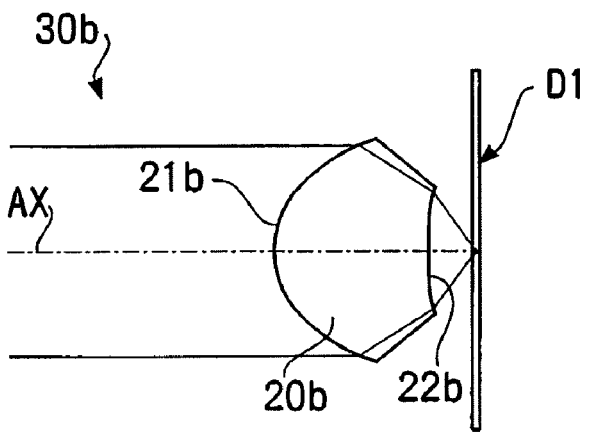
Figure 7B:
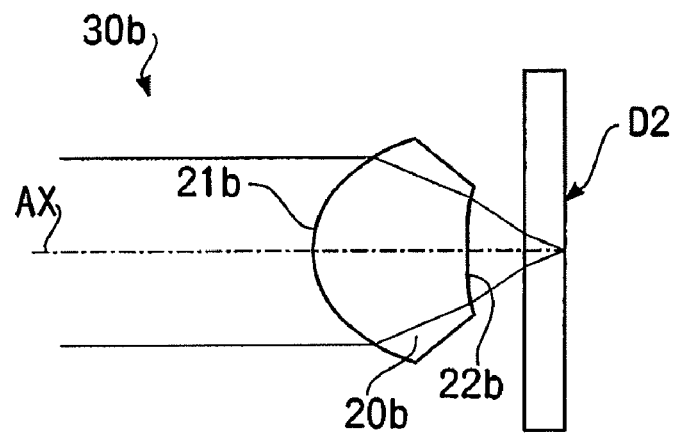
Figure 7C:
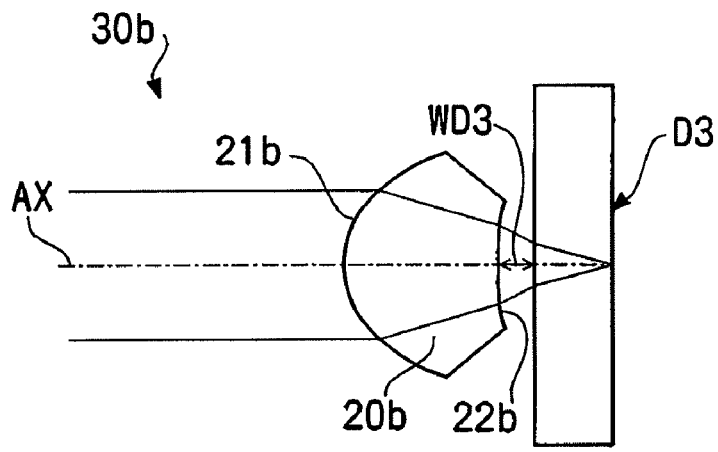

FIG. 7A shows a configuration of the objective optical system according to a third example defined when the first optical disc is used, FIG. 7B shows a configuration of the objective optical system defined when the second optical disc is used, and FIG. 7C shows a configuration of the objective optical system defined when the third optical disc is used.

FIG. 8A is a graph illustrating the spherical aberration caused when the first laser beam is used in the optical information recording/reproducing device according to the third example, FIG. 8B is a graph illustrating the spherical aberration caused when the second laser beam is used in the optical information recording/reproducing device according to the third example, and FIG. 8C is a graph illustrating the spherical aberration caused when the third laser beam is used in the optical information recording/reproducing device according to the third example.

Figure 9A:
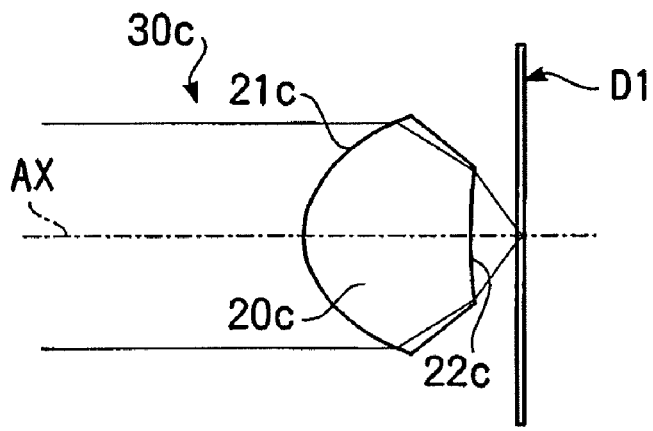
Figure 9B:
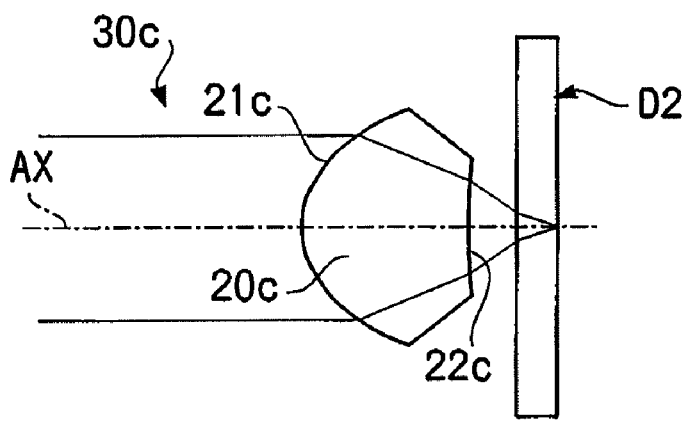
Figure 9C:
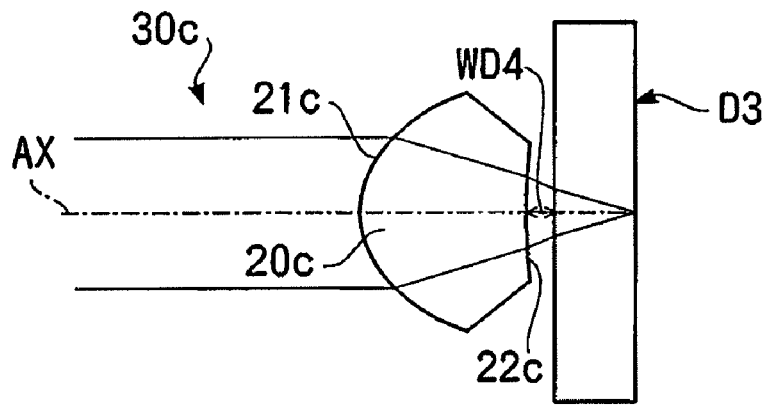

FIG. 9A shows a configuration of the objective optical system according to a forth example defined when the first optical disc is used, FIG. 9B shows a configuration of the objective optical system defined when the second optical disc is used, and FIG. 9C shows a configuration of the objective optical system defined when the third optical disc is used.

Figure 10A:
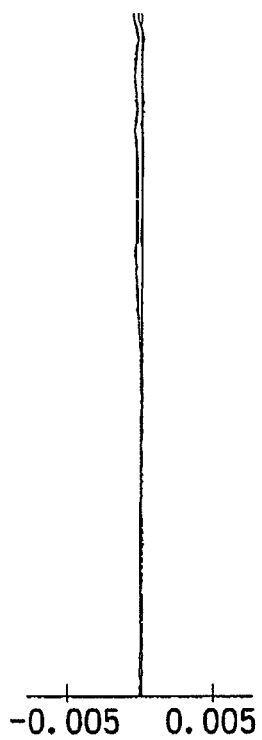
Figure 10B:
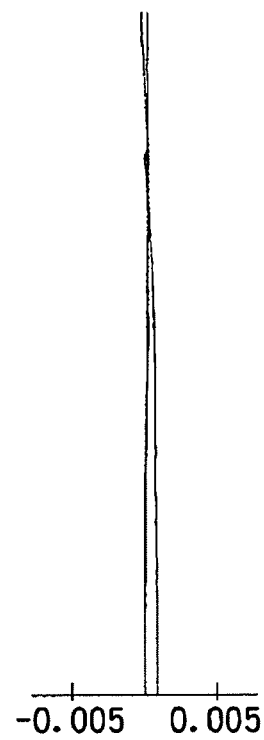
Figure 10C:
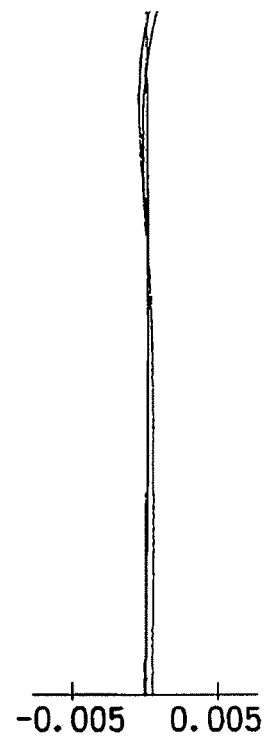

FIG. 10A is a graph illustrating the spherical aberration caused when the first laser beam is used in the optical information recording/reproducing device according to the fourth example, FIG. 10B is a graph illustrating the spherical aberration caused when the second laser beam is used in the optical information recording/reproducing device according to the fourth example, and FIG. 10C is a graph illustrating the spherical aberration caused when the third laser beam is used in the optical information recording/reproducing device according to the fourth example.

Figures 11A, 11B:
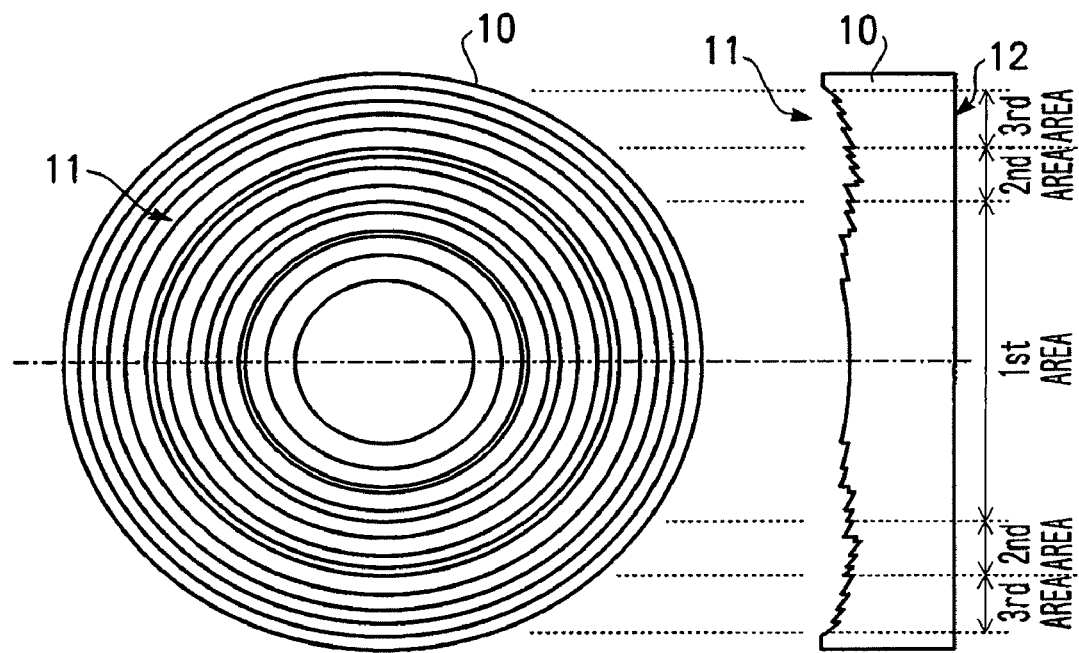

FIG. 11A is a front view illustrating an annular zone structure formed on a first surface of a phase annular zone plate, and FIG. 11B is a cross sectional view of the phase annular zone plate illustrating the annular zone structure formed thereon.

Figure 12:
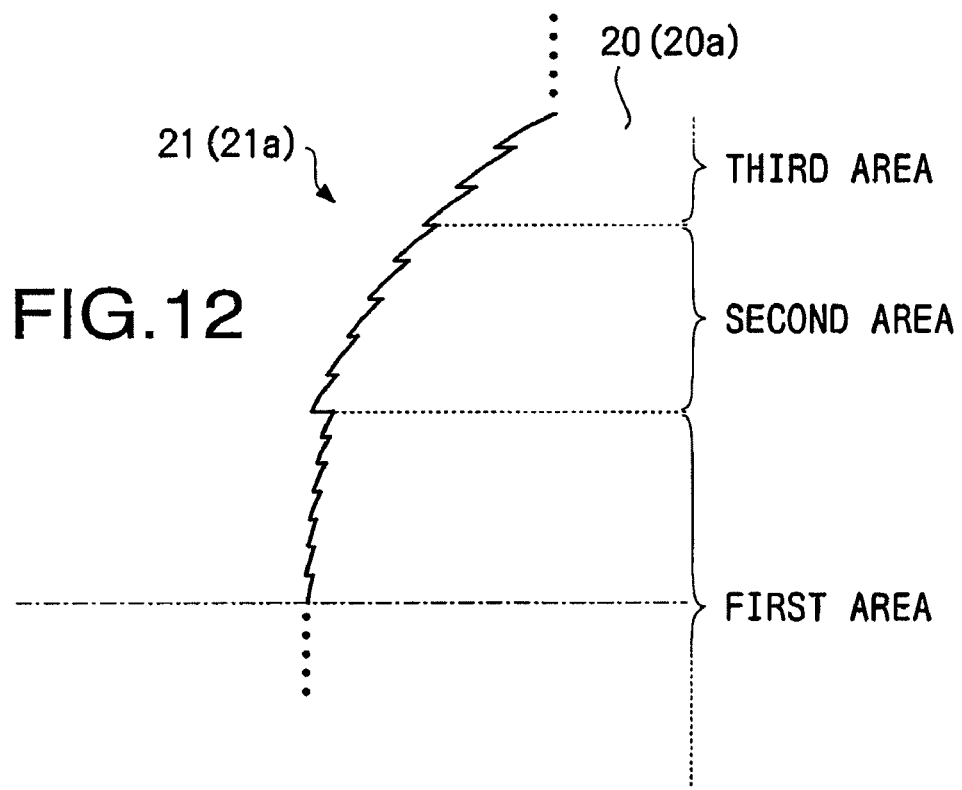

FIG. 12 is a conceptual illustration of the annular zone structure formed on the objective lens.

DETAILED DESCRIPTION OF THE EMBODIMENTS

Hereinafter, an embodiment according to the invention is described with reference to the accompanying drawings.

In the following, an objective optical system 30 according to the embodiment, and an optical information recording/reproducing device 100 on which the objective optical system 30 is mounted are described (see FIG. 1). As described in detail below, the optical information recording/reproducing device 100 has the compatibility with three types of optical discs differing in recording density.

In the following explanation, an optical disc of a type (one of the three types) having the highest recording density (e.g. a new-standard optical disc such as HD DVD or BD) will be referred to as an "optical disc D1", an optical disc of a type having a relatively low recording density compared to the optical disc D1 (DVD, DVD-R, etc.) will be referred to as an "optical disc D2", and an optical disc of a type having the lowest recording density (CD, CD-R, etc.) will be referred to as an "optical disc D3" for convenience of explanation.

If the protective layer thicknesses of the optical discs D1-D3 are defined as t1, t2, t3, respectively, the protective layer thicknesses satisfies a following relationship.

$$t1<t2<t3$$

In order to carry out the information reproducing/recording on each of the optical discs D1-D3, the NA (Numerical Aperture) required for the information reproducing/recording has to be varied properly so that a beam spot suitable for the particular recording density of each optical disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationship.

$$NA1 > NA2 > NA3$$

Specifically, for the information recording/reproducing on the optical discs D1 and D2 having high recording densities, a relatively large NA is required since a relatively small spot has to be formed. On the other hand, for the information recording/reproducing on the optical disc D3 having the lowest recording density, the required NA is relatively small. Incidentally, each optical disc is set on a turntable (not shown) and rotated at high speed when the information recording/reproducing is carried out.

In cases where three types of optical discs D1-D3 (having different recording densities) are used as above, multiple laser beams having different wavelengths are selectively used by the optical information recording/reproducing device so that a beam spot suitable for each recording density can be formed on the record surface of the optical disc being used.

Specifically, for the information recording/reproducing on the optical disc D1, a "first laser beam" having the shortest wavelength is emitted from a light source so as to form the smallest beam spot on the record surface of the optical disc D1. On the other hand, for the information recording/reproducing on the optical disc D3, a "third laser beam" having the longest wavelength is emitted from a light source so as to form the largest beam spot on the record surface of the optical disc D3. For the information recording/reproducing on the optical disc D2, a "second laser beam" having a wavelength longer than that of the first laser beam and shorter than that of the third laser beam is emitted from a light source so as to form a relatively small beam spot on the record surface of the optical disc D2.

If the wavelengths of the first, second and third laser beams are defined as $\lambda 1$, $\lambda 2$ and $\lambda 3$, respectively, the wavelengths satisfy the following relationship.

$$\lambda 1 < \lambda 2 < \lambda 3$$

Figure 1:
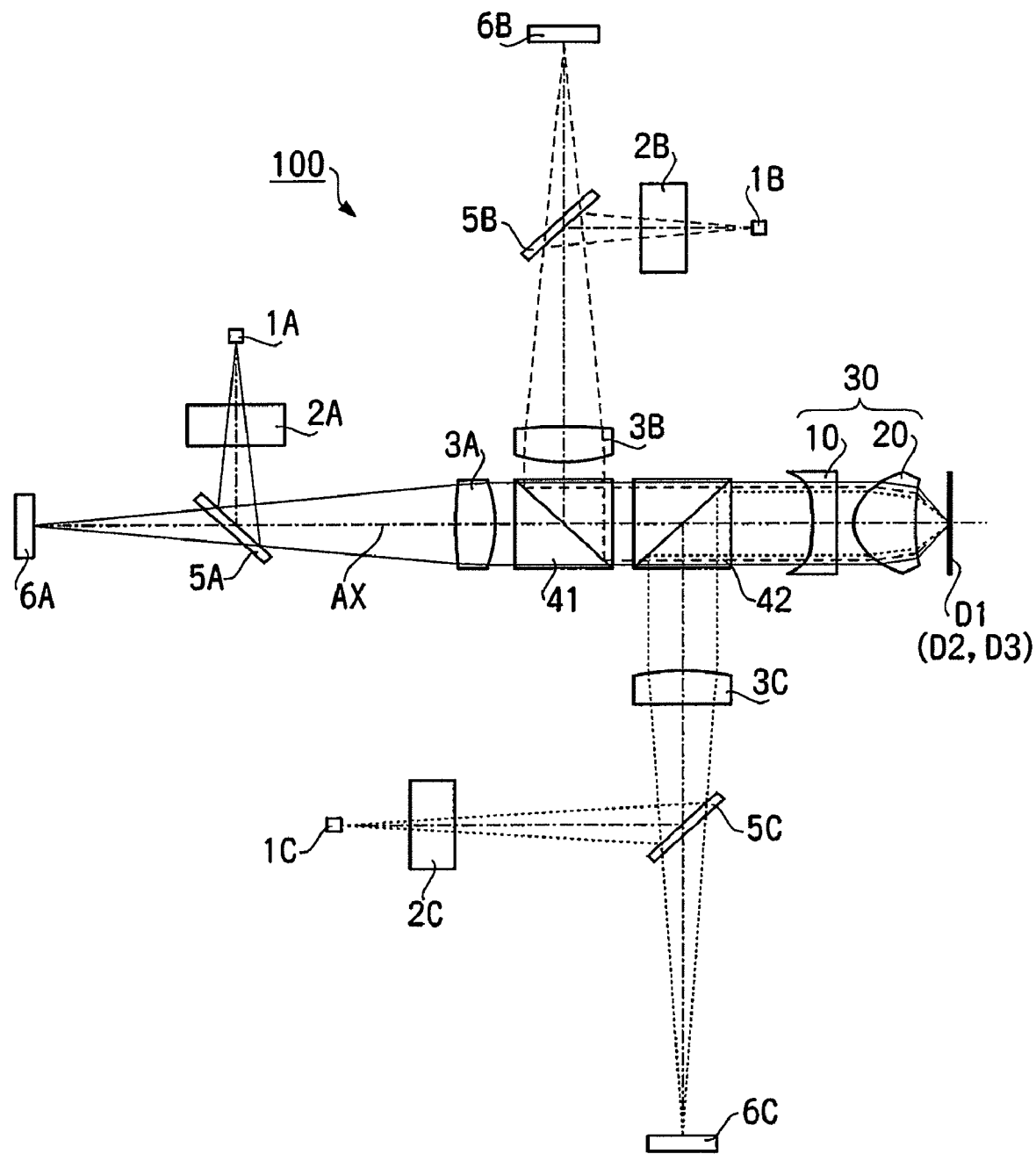
FIG. 1 illustrates a general configuration of an optical information recording/reproducing device on which an objective optical system is mounted.

FIG. 1 illustrates a general configuration of the optical information recording/reproducing device 100 on which the objective optical system 30 is mounted. As shown in FIG. 1, the optical information recording/reproducing device 100 includes a light source 1A which emits the first laser beam, a light source 1B which emits the second laser beam, a light source 1C which emits the third laser beam, diffraction gratings 2A, 2B and 2C, coupling lenses 3A, 3B and 3C, beam splitters 41 and 42, half mirrors 5A, 5B and 5C, photoreceptors 6A, 6B and 6C, and the objective optical system 30.

In FIG. 1, a reference axis AX of the optical information recording/reproducing device 100 is indicated by a chain line. In FIG. 1, the first, second third laser beams are indicated by a solid line, a dashed line and a dotted line, respectively. In a normal state, an optical axis of the objective optical system 30 coincides with the reference axis AX of the optical information recording/reproducing device 100. However, the optical axis of the objective optical system 30 or an optical axis of an objective lens 20 may shift from the reference axis AX for a tracking operation.

As described above, the required NA varies depending on the type of the optical disc being used. Therefore, the optical information recording/reproducing device 100 may be provided with one or more aperture stops for adjusting beam diameters of the first to third laser beams.

Each optical disc has the protective layer and the record surface (not shown). Practically, the record surface is sandwiched between the protective layer and a substrate layer or a label layer.

As shown in FIG. 1, the first, second and third laser beams emitted by the light sources 1A, 1B and 1C are directed to a common optical path after passing through the diffraction gratings 2A, 2B, and 2C, the coupling lenses 3A, 3B and 3C, and the beam splitters 41 and 42. Then, each of the first, second and third laser beams enters the objective optical system 30. The first, second and third laser beams emitted by the light sources 1A, 1B and 1C are converted into collimated beams by the coupling lenses 3A, 3B and 3C, respectively. That is, in this embodiment, each of the coupling lenses 3A, 3B and 3C functions as a collimator lens. Therefore, each of the first, second and third laser beams enters the objective optical system 30 as a collimated beam.

By thus configuring the optical information recording/reproducing device 100, it is possible to suitably suppress off-axis aberrations, such as a coma, even if the objective optical system 30 (or the objective lens 20) shifts by a minute distance in a direction perpendicular to the optical axis of the objective optical system 30 for the tracking operation.

Each of the first, second and third laser beams passed through the objective optical system 30 converges onto the record surface of the corresponding optical disc. The laser beam reflected from the record surface of each of the optical discs D1, D2 and D3 returns along the same optical path, and thereafter passes through the corresponding one of the half mirror 5A, 5B and 5C before finally detected by the corresponding one of the photoreceptors 6A, 6B and 6C.

Since the first to third laser beams having different wavelengths are used for the optical discs D1-D3 in the optical information recording/reproducing device 100, the spherical aberration varies depending on change of the refractive index of the objective lens 20 and the difference in protective layer thicknesses between the optical discs D1-D3. In order to provide the compatibility with the three types of optical discs D1-D3 for the optical information recording/reproducing device 100, it is necessary to suitably correct the spherical aberration for each of the optical discs D1-D3. In order to perform the information recording/reproducing for each of the optical discs D1-D3 in a high degree of accuracy while keeping a high S/N level, it is necessary to increase the use efficiency of light so that a beam spot having a predetermined diameter is formed on the record surface of the optical disc being used by a larger amount of light. For this reason, the objective optical system 30 according to the embodiment is configured as follows.

Figure 2A:
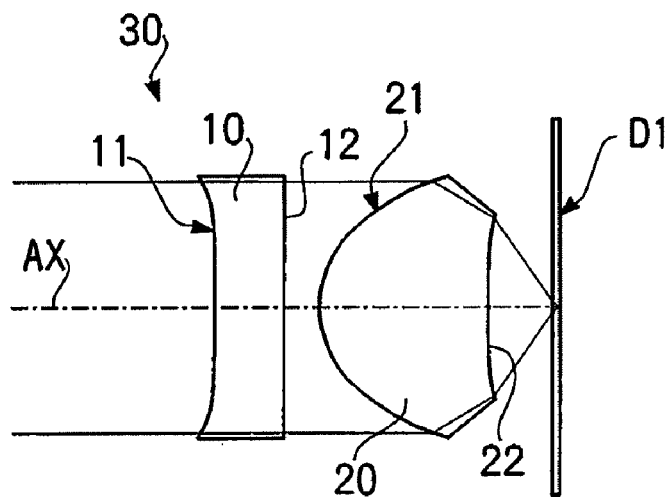
FIG. 2A illustrates in detail an objective optical system according to the embodiment defined when an optical disc D1 (first laser beam) is used.
Figure 2B:
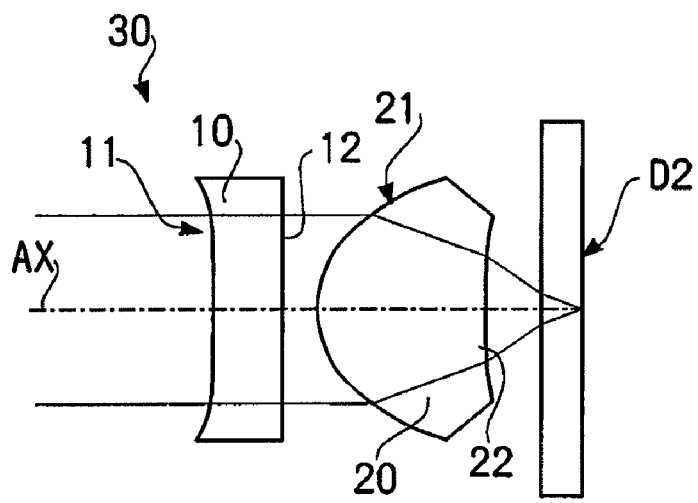
FIG. 2B illustrates in detail the objective optical system defined when an optical disc D2 (second laser beam) is used.
Figure 2C:
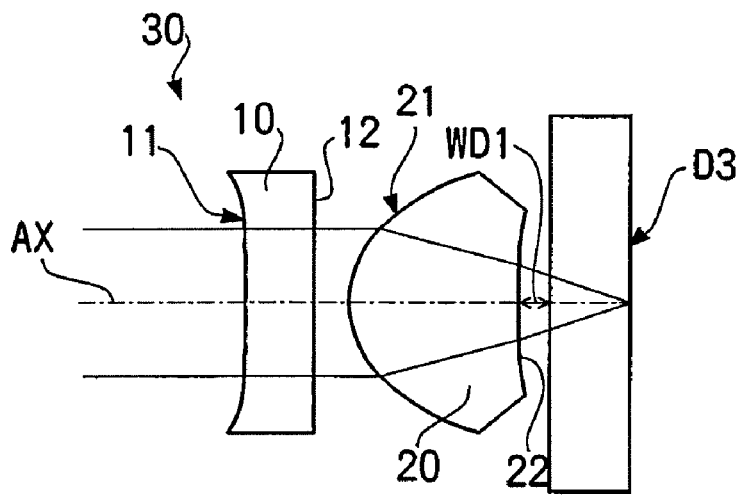
FIG. 2C illustrates in detail the objective optical system defined when an optical disc D3 (third laser beam) is used.

As shown in FIG. 1, the objective optical system 30 is provided with a phase annular zone plate 10 and the objective lens 20 in this order from the light source side. FIG. 2A illustrates in detail the objective optical system 30 defined when the optical disc D1 (first laser beam) is used. FIG. 2B illustrates in detail the objective optical system 30 defined when the optical disc D2 (second laser beam) is used. FIG. 2C illustrates in detail the objective optical system 30 defined when the optical disc D3 (third laser beam) is used. It should be noted that the structure of the objective optical system 30 is not changed even when the optical disc being used is switched between the optical discs D1-D3.

The positional relationship between the phase annular zone plate 10 and the objective lens 20 is maintained, for example, by fixing the phase annular zone plate 10 and the objective lens 20 to a fixing member, such as a lens frame. By this structure, it is possible to prevent the aberrations from occurring due to an error of the positional relationship between the phase annular zone plate 10 and the objective lens 20 in a direction of the optical axis (i.e., the reference axis AX).

As shown in FIGS. 2A-2C, the phase annular zone plate 10 includes a first surface 11 and a second surface 12 in this order from the light source side. The objective lens 20 is a biconvex single-element lens having a first surface 21 and a second surface 22 in this order from the light source side.

Each of the first surface 11 of the phase annular zone plate 10 and the first and second surfaces 21 and 22 of the objective lens 20 is an aspherical surfaces.

A shape of an aspherical surface is expressed by a following equation:

$$X(h) = \frac{ch^2}{1 + \sqrt{1-(1+K)c^2h^2}} + \sum_{i=2} A_{2i} h^{2i}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_{2i}$ (i: an integer larger than or equal to 2) represents an aspherical coefficient of an even order larger than or equal to the fourth order.

The phase annular zone plate 10 is an optical element made of a single material. More specifically, the phase annular zone plate 10 is made of synthetic resin in view of easiness and effectiveness of manufacture. As described in detail below, an annular zone structure is formed on at least one of optical surfaces of the objective optical system 30.

The annular zone structure may be formed on one of the first and second surfaces 11 and 12 of the phase annular zone plate 10. Alternatively, the annular zone structure may be formed on both the first and second surfaces 11 and 12 of the phase annular zone plate 10. In the following, explanation is made for the case where the annular zone structure is formed on the first surface 11 of the phase annular zone plate 10.

The annular zone structure includes a plurality of refractive surface zones (annular zones) concentrically formed about the reference axis AX. The plurality of annular zones are divided by minute steps which are formed at boundaries between adjacent ones of the plurality of annular zones and which extend in parallel with the optical axis.

Each step is designed such that a predetermined optical path length difference is caused between a laser beam passing through the inside of a boundary and a laser beam passing through the outside of the boundary. It is noted that such an annular zone structure may be called a diffraction structure.

If the annular zone structure is designed such that the predetermined optical path length difference is a n-fold value (n: integer) of a particular wavelength α, the annular zone structure may be expressed as an n-th order diffraction structure having a blazed wavelength α. If a laser beam having a particular wavelength β passes through the diffraction structure, the diffraction order having the highest diffraction efficiency is equal to an integer "m" closest to a value obtained by dividing the optical path length difference given to the beam of the wavelength β with the wavelength β.

Considering the fact that an optical path length difference is caused between the laser beam passing through the inside of the boundary and the laser beam passing through the outside of the boundary, the effect of the annular zone structure may be expressed in such a manner that the phases of the laser beam passing through the inside of the boundary and the laser beam passing through the outside of the boundary shift with respect to each other by the effect of the step. Therefore, the annular zone structure may be called a structure for shifting the phase of an incident light beam (i.e., a phase shift structure).

If the annular zone structure is considered as the diffraction structure, the annular zone structure can be expressed by a following optical path difference function ϕi(h):

$$\phi i(h) = (P_{i2} \times h^2 + P_{i4} \times h^4 + P_{i6} \times h^6 + P_{i8} \times h^8 + P_{i10} \times h^{10} + P_{i12} \times h^{12}) m_i \lambda$$

where $P_{i2}$, $P_{i4}$, $P_{i6}$ ... (i: natural number) represent coefficients of the $2^{nd}$ order, $4^{th}$ order, $6^{th}$ order, ... of the i-th optical path difference function, h represents a height from the optical axis, $m_i$ represents a diffraction order at which the diffraction efficiency is maximized, and λ represents a design wavelength of a laser beam being used.

The optical path difference function ϕi(h) represents the function as a diffraction lens in a form of an additional optical path length at a height h from the optical axis. That is, the optical path difference function ϕi(h) is a function which defines the position and height of each step in the annular zone structure.

The annular zone structure formed on the phase annular zone plate 10 may be configured through use of a plurality of types of optical path difference functions or may be configured through use of a single type of optical path difference function. In this embodiment, the annular zone structure is configured through use of two types of optical path difference functions (i.e., first and second optical path difference functions). By combining the two types of optical path difference functions, two types of steps giving optical path length differences different from each other to a laser beam incident on the annular zone structure are formed in the annular zone structure. That is, two types of optical effects are given to an incident beam by the annular zone structure. In the following, each step defined in the annular zone structure by the first optical path difference function is referred to as a "first step", and each step defined in the annular zone structure by the second optical path difference function is referred to as a "second step". It should be understood that the annular zone structure may be configured by combining more then two types of optical path difference functions.

If the annular zone structure is regarded as a diffraction structure, the annular zone structure is formed such that the diffraction order at which the diffraction efficiency for the first laser beam is maximized is a $1^{st}$ order, the diffraction order at which the diffraction efficiency for the second laser beam is maximized is a 0-th order, the diffraction order at which the diffraction efficiency for the third laser beam is maximized is a 0-th order, and the following condition (1) is satisfied.

$$-0.36 \times 10^2 < P_{12} \times f1 + 5.0 \times 10^3 \times (n1 - n3) < 1.80 \times 10^2 \quad (1)$$

In the condition (1), $P_{12}$ denotes a second order coefficient of the first optical path difference function, f1 denotes a total focal length of the objective optical system 30 with respect to the first laser beam, n1 denotes a refractive index of the objective lens 20 with respect to the first laser beam, and n3 denotes a refractive index of the objective lens 20 with respect to the third laser beam.

Further, the annular zone structure defined by the second optical path difference function is configured such that the diffraction order at which the diffraction efficiency for the first laser beam is maximized is a $2^{nd}$ order, the diffraction order at which the diffraction efficiency for the second laser beam is maximized is a $1^{st}$ order, and the diffraction order at which the diffraction efficiency for the first laser beam is maximized is a $1^{st}$ order.

By thus configuring the objective optical system 30, the objective optical system 30 is able to suitably correct the spherical aberration for each of the first to third laser beams regardless of the fact that each of the first to third laser beams is incident on the objective optical system 30 as a collimated beam. In addition, it is possible to suitably correct the longitudinal chromatic aberration when the optical disc D1 is used, and to secure an adequate working distance WD1 when the optical disc D3 is used (see FIG. 2C). As shown in FIG. 2C, the working distance D1 is a distance defined between the surface of the optical disc D3 and the second surface 22 of the objective lens 20 when the optical disc D3 is used.

Since the protective layer thickness of the optical disc D3 is larger than the protective layer thicknesses of the optical discs D1 and D2, the working distance for the optical disc D3 tends to become short. For example, if a diverging beam is incident on the objective optical system 30 during use of the optical disc D3, the back focus of the objective lens 20 becomes long and therefore an adequate working distance can be secured. Therefore, in such a case, the annular zone structure does not need to have a special structure for securing the adequate working distance. By contract, if a collimated beam is incident on the objective optical system during use of the optical disc D3, the back focus becomes short in comparison with the case where a diverging beam is used, and therefore the working distance also becomes short. In this case, when the information recording or the information reproducing for CD is performed, an objective lens might contact with CD. For this reason, the annular zone structure is provided with a special structure for securing an adequate working distance as described below.

As described above, the annular zone structure defined by the first optical path difference function is configured such that the diffraction orders at which the diffraction efficiencies for the first to third laser beams are maximized are $1^{st}$ order, $0^{th}$ order and $0^{th}$ order, respectively, and the condition (1) is satisfied. As a result, the back focus of the objective lens 20 is increased, and therefore, an adequate working distance WD1 can be secure. Further, the longitudinal chromatic aberration produced when the optical disc D1 is used can be suitably corrected.

If the intermediate term of the condition (1) ($P_{12} \times f1 + 5.0 \times 10^3 \times (n1-n3)$) gets larger than or equal to the upper limit of the condition (1), the longitudinal chromatic aberration during use of the optical disc D1 becomes an undercorrected condition, and it becomes difficult to secure an adequate working distance for the optical disc D3. If the intermediate term of the condition (1) gets lower than or equal to the lower limit of the condition (1), the longitudinal chromatic aberration during use of the optical disc D1 becomes an overcorrected condition, and the amount of light might be decreased by increase of the number of steps in the annular zone structure.

As described above, the annular zone structure defined by the second optical path difference function is configured such that the diffraction orders at which the diffraction efficiencies for the first to third laser beams are maximized are $2^{nd}$ order, $1^{st}$ order and $1^{st}$ order, respectively. Such a configuration makes it possible to maintain the use efficiency of light at a high level while suppressing change of the spherical aberration at a low level even if the wavelength of the laser beam being used varies by a minute amount.

The annular zone structure may be configured to further satisfy the following condition (2) to suitably correct the longitudinal chromatic aberration during use of the optical disc D1.

$$0.12 \times 10^2 < P_{12} \times f1 + 5.0 \times 10^3 \times (n1-n3) < 1.50 \times 10^2 \quad (2)$$

If the annular zone structure is regarded as a phase shift structure, the annular zone structure is configured to have the first step and the second step which give different optical path length differences to an incident beam at boundaries between adjacent ones of the refractive surface zones. When an optical path length difference given by the first step to the first laser beam is represented as $\Delta OPD_{11}/\lambda 1$, an optical path length difference given by the second step to the first laser beam is represented as $\Delta OPD_{21}/\lambda 1$, the number of first steps is represented as $N_{11}$, f1 denotes a total focal length of the objective optical system 30 with respect to the first laser beam, n1 denotes a refractive index of the objective lens 20 with respect to the first laser beam, and n3 denotes a refractive index of the objective lens 20 with respect to the third laser beam, the first step satisfies the following conditions (3) and (4), and the second step satisfies the condition (5).

$$-0.92 < \Delta OPD_{11}/\lambda 1 < -0.50 \quad (3)$$

$$-5.00 \times 10^2 < N_{11} \times f1 - 1.25 \times 10^4 \times (n1-n3) < -0.50 \times 10^2 \quad (4)$$

$$1.80 < |\Delta OPD_{21}/\lambda 1| < 2.20 \quad (5)$$

The annular zone structure satisfying the conditions (3), (4) and (5) is able to suitably correct the spherical aberration for each of the first to third laser beams regardless of the fact that each of the first to third laser beams is incident on the objective optical system 30 as a collimated beam. In addition, it is possible to suitably correct the longitudinal chromatic aberration when the optical disc D1 is used, and to secure an adequate working distance WD1 when the optical disc D3 is used.

If the intermediate term of the condition (3) gets larger than or equal to the upper limit of the condition (3) or the intermediate term of the condition (5) gets larger than or equal to the upper limit of the condition (5), an adequate level of use efficiency of light can not be secured for the first laser beam, and in this case the information recording and the information reproducing for the optical disc D1 might not be performed properly. If the intermediate term of the condition (3) gets smaller than or equal to the lower limit of the condition (3) or the intermediate term of the condition (5) gets lower than or equal to the lower limit of the condition (5), an adequate level of use efficiency of light can not be secured particularly when the information recording or the information reproducing is performed for each of the second and third laser beams is performed, and in this case the information recording and the information reproducing might not be performed properly for each of the optical discs D2 and D3.

If the intermediate term of the condition (4) gets larger than or equal to the upper limit of the condition (4), the longitudinal chromatic aberration during use of the first laser beam becomes an undercorrected condition, and therefore it becomes difficult to secure an adequate working distance for the optical disc D3. If the intermediate term of the condition (4) gets lower than or equal to the lower limit of the condition (4), the longitudinal chromatic aberration during use of the optical disc D1 becomes an overcorrected condition, and the amount of light might be decreased due to increase of the number of steps in the annular zone structure.

The annular zone structure may be configured to additionally satisfy the following condition (6).

$$-3.50\times10^2 < N_{11}\times f1 - 1.25\times10^4\times(n1-n3) < -1.50\times10^2 \quad (6)$$

By configuring the annular zone structure to satisfy the condition (6) in addition to satisfying the condition (4), it becomes possible to more suitably correct the longitudinal chromatic aberration when the optical disc D1 is used.

The above described advantages can be achieved by forming the above described annular zone structure at least in an area (hereafter, referred to as a first area) contributing to converging the third laser beam onto the record surface of the optical disc D3. More specifically, the first are is defined as an area which includes the optical axis of the phase annular zone plate 10 and contributes to convergence of all of the first to third laser beams.

The first surface 11 of the phase annular zone plate 10 may be provided with a second area which has an annular zone structure different from that of the first area and which is formed outside the first area. In this case, the second area is configured to contribute to converging the first and second laser beams onto the record surfaces of the optical discs D1 and D2, respectively, and not to contribute to converging the third laser beam. That is, the second area functions as an aperture stop for the third laser beam.

The annular zone structure formed in the second area has steps giving at least a single type of optical path length difference to an incident beam. That is, the annular zone structure formed in the second area is formed by a single type of optical path difference function or by combining two or more types of optical path difference functions. To achieve the function as the aperture stop, the annular zone structure in the second area is configured such that an absolute value of an optical path length difference given by at least a single type of step in the second area is substantially equal to an odd multiple of the wavelength $\lambda 1$.

For example, the annular zone structure having a step giving an optical path length difference approximately equal to $5\lambda 1$ or $3\lambda 1$ is formed in the second area so that the diffraction order at which the diffraction efficiency for the first laser beam is maximized is $5^{th}$ order or $3^{rd}$ order. When the third laser beam is incident on the annular zone structure in the second area configured as above, two types of diffraction order light which have substantially the same intensity and have diffraction orders different from each other are produced. Therefore, the third laser beam passed through the second area does not converge onto the record surface of the optical disc D3.

The phase annular zone plate 10 may be provided with a third area which is formed outside the second area and which has an annular zone structure different from the annular zone structures in the first and second areas. The third area contributes to converging the first laser beam onto the record surface of the optical disc D1 and does not contribute to convergence of both of the second and third laser beams. That is, the third area secures the NA required for the information recording or the information reproducing for the optical disc D1 having the highest density. Therefore, the third area can be regarded as a dedicated area for the first laser beam.

As in the case of the second area, the annular zone structure in the third area has steps giving at least a single type of optical path length difference to an incident beam. To provide a function as an aperture stop for the second and third laser beams, the annular zone structure in the third area is configured such that an absolute value of an optical path length difference given by east step in the third area is different from an absolute value of the optical path length difference given by each step in the second area. For example, the third area is provided with steps giving an optical path length difference corresponding to an odd multiple of the wavelength $\lambda 1$ of the first laser beam (e.g., $1\lambda 1$) so that the diffraction order at which the diffraction efficiency for the first laser beam is maximized is an odd order (e.g., $1^{st}$ order). With this configuration, only the first laser beam of the leaser beams passing through the third area achieves a high level of diffraction efficiency, and it becomes possible to suppress change of the spherical aberration due to minute wavelength variations.

FIGS. 11A and 11B are conceptual illustrations of the annular zone structure formed on the first surface 11 of the phase annular zone plate 10. FIG. 11A is a front view illustrating the annular zone structure formed on the first surface 11 of the phase annular zone plate 10, and FIG. 11B is a cross sectional view of the phase annular zone plate 10 illustrating the annular zone structure formed on the first surface 11 of the phase annular zone plate 10. In each of FIGS. 11A and 11B, the first to third areas are illustrated.

In the following, four concrete examples (first to fourth examples) of the optical information recording/reproducing device 100 employing the objective optical system 30 are described. The optical block diagram of the optical information recording/reproducing device 100 according to the first example is the same as that shown in FIG. 1. On the other hand, the optical information recording/reproducing device 100 according to each of the second to fourth examples is configured not to have the phase annular zone plate 10. That is, the objective optical system 30 of each of the second to fourth examples is constituted only by the objective lens 20.

In place of employing the phase annular zone plate 10, the optical information recording/reproducing device 100 according to each of the second to fourth examples is configured such that the same annular zone structure as that provided on the phase annular zone plate 10 is formed on at least one of the first and second surfaces 21 and 22 of the objective lens 20 (preferably on the first surface 21). Therefore, the objective optical system 30 according to the first example and the objective optical system 30 according to each of the third to fourth examples have the same optical effect on an incident beam. In the following examples, the protective layer thicknesses t1, t2 and t3 of the optical discs D1-D3 are defined as follows.

t1=0.1 mm, t2=0.6 mm, t3=1.2 mm

FIRST EXAMPLE

The objective optical element 30 mounted on the optical information recording/reproducing device 100 according to the first example is shown in FIGS. 2A, 2B and 2C. In the following, explanations focus on the numerical configuration of the objective optical system 30 for the sake of simplicity. The following Table 1 shows concrete specifications of the objective optical system 30 according to the first example.

TABLE 1

|  | $1^{st}$ laser beam | $2^{nd}$ laser beam | $3^{rd}$ laser beam |
| --- | --- | --- | --- |
| Wavelength (nm) | 405 | 660 | 790 |
| Focal Length (mm) | 2.50 | 2.65 | 2.67 |
| NA | 0.85 | 0.60 | 0.47 |
| Magnification M | 0.000 | 0.000 | 0.000 |

As indicated by the "Magnification M" in Table 1, the laser beam is incident upon the objective optical system 30 as a collimated beam when each of the optical discs D1-D3 is used. With this configuration, it is possible to prevent the off-axis aberration from occurring during the tracking operation.

Table 2 shows a specific numerical configuration defined when the optical disc D1 is used in the optical information recording/reproducing device 100 provided with the objective optical system 30 shown in Table 1. The following Table 2 shows specific numerical configuration defined when the optical disc D2 is used in the optical information recording/reproducing device 100 provided with the objective optical system 30 shown in Table 1. The following Table 3 shows specific numerical configuration defined when the optical disc D3 is used in the optical information recording/reproducing device 100 provided with the objective optical system 30 shown in Table 1.

TABLE 2

| Surface No. | r | d | n(405 nm) | |
|---|---|---|---|---|
| 1(1st Area) | −40.210 | 1.00 | 1.65098 | Phase Annular Zone Plate |
| 1(2nd Area) | −40.210 | | | |
| 1(3rd Area) | −40.210 | | | |
| 2 | ∞ | 0.50 | | |
| 3 | 1.810 | 2.55 | 1.71557 | Objective Lens |
| 4 | −63.340 | 0.97 | | |
| 5 | ∞ | 0.10 | 1.62231 | Optical Disc D1 |
| 6 | ∞ | — | | |

TABLE 3

| Surface No. | r | d | n(660 nm) | |
|---|---|---|---|---|
| 1(1st Area) | −40.210 | 1.00 | 1.59978 | Phase Annular Zone Plate |
| 1(2nd Area) | −40.210 | | | |
| 1(3rd Area) | −40.210 | | | |
| 2 | ∞ | 0.50 | | |
| 3 | 1.810 | 2.55 | 1.68937 | Objective Lens |
| 4 | −63.340 | 0.83 | | |
| 5 | ∞ | 0.60 | 1.57961 | Optical Disc D2 |
| 6 | ∞ | — | | |

TABLE 4

| Surface No. | r | d | n(790 nm) | |
|---|---|---|---|---|
| 1(1st Area) | −40.210 | 1.00 | 1.59073 | Phase Annular Zone Plate |
| 1(2nd Area) | −40.210 | | | |
| 1(3rd Area) | −40.210 | | | |
| 2 | ∞ | 0.50 | | |
| 3 | 1.810 | 2.55 | 1.68436 | Objective Lens |

TABLE 4-continued

| Surface No. | r | d | n(790 nm) | |
|---|---|---|---|---|
| 4 | −63.340 | 0.46 | | |
| 5 | ∞ | 1.20 | 1.57307 | Optical Disc D3 |
| 6 | ∞ | — | | |

In the Tables 2-4, the surfaces #1 and #2 represent the first and second surfaces 11 and 12 of the phase annular zone plate 10, respectively, the surfaces #3 and #4 represent the first and second surfaces 21 and 22 of the objective lens 20, and the surfaces #5 and #6 represent the protective layer and the record surface of the corresponding optical disc.

In Tables 2-4 (and in the following similar Tables), "r" denotes the curvature radius (mm) of each optical surface, and "d" denotes the thickness of an optical components or the distance (mm) from each optical surface to the next optical surface during the information reproduction/recordation.

Each of the first surface 11 (surface #1) of the phase annular zone plate 10 and the first and second surfaces 21 and 22 (surfaces #3 and #4) of the objective lens 20 is an aspherical surface. The following Table 5 shows the cone constants K and aspherical coefficients $A_{2i}$ specifying the shape of each of the first surface 11 (surface #1) of the phase annular zone plate 10 and the first and second surfaces 21 and 22 (surfaces #3 and #4) of the objective lens 20. In Table 5 (and in the following similar Tables), the notation "E" means the power of 10 with an exponent specified by the number to the right of E (e.g. "E-04" means "×10$^{-4}$").

TABLE 5

| Surface No. | K | A4 | A6 | A8 | A10 |
|---|---|---|---|---|---|
| 1(1st Area) | 0.0000 | −3.9330E−03 | −7.4200E−04 | 0.0000E+00 | 0.0000E+00 |
| 1(2nd Area) | 0.0000 | −5.1040E−03 | 5.1070E−04 | 2.5800E−05 | 0.0000E+00 |
| 1(3rd Area) | 0.0000 | −2.8240E−03 | −2.1860E−04 | −1.3600E−07 | 0.0000E+00 |
| 3 | −0.7000 | 6.1220E−03 | 8.1930E−04 | 1.0220E−04 | 1.1380E−05 |
| 4 | 0.0000 | 5.2480E−02 | −3.1090E−02 | 1.1130E−02 | −2.2590E−03 |

| Surface No. | A12 | A14 | A16 | A18 | A20 |
|---|---|---|---|---|---|
| 1(1st Area) | 0.0000E+00 | 0.0000E+00 | 0.0000E+00 | 0.0000E+00 | 0.0000E+00 |
| 1(2nd Area) | 0.0000E+00 | 0.0000E+00 | 0.0000E+00 | 0.0000E+00 | 0.0000E+00 |
| 1(3rd Area) | 0.0000E+00 | 0.0000E+00 | 0.0000E+00 | 0.0000E+00 | 0.0000E+00 |
| 3 | 7.1150E−07 | 0.0000E+00 | 0.0000E+00 | 0.0000E+00 | 0.0000E+00 |
| 4 | 1.9870E−04 | 0.0000E+00 | 0.0000E+00 | 0.0000E+00 | 0.0000E+00 |

As shown in Table 5, the first surface 11 (surface #1) of the phase annular zone plate 10 includes a first area including the optical axis, a second area arranged outside the first area, and a third area arranged outside the second area. The first to third areas are defined by a height h (i.e., an effective radius) from the optical axis as indicated below.

First Area: $0.000 \leq h \leq 1.250$

Second Area: $1.250 < h \leq 1.590$

Third Area: $1.590 < h \leq 2.125$

More specifically, the first area is a common area contributing to convergence of each of the first, second and third laser beams. The second area contributes to convergence of each of the first and second laser beams, but does not contribute to convergence of the third laser beam. In other words, the second area functions as an aperture stop for the third laser beam.

To provide the above described different types of optical effects for the first to third areas, respectively, each of the first to third areas is designed independently to have a unique annular zone structure. In particular, each of the first and second areas has the annular zone structure defined by two types of optical path difference functions different from each other.

Table 6 shows the coefficients $P_{2i}, P_{4i}, P_{6i}, \ldots$ of the optical path difference function defining the annular zone structure of each of the first to third areas on the first surface 11 of the phase annular zone plate 10. Table 7 shows the diffraction order m at which the diffraction efficiency for the laser beam is maximized and an effective radius (height from the optical axis) for each of the first to third areas. In Tables 6 and 7 (and in the following similar tables), "OPDF" means an optical path difference function.

TABLE 6

| SurfaceNo. | OPDF | P2 | P4 | P6 |
|---|---|---|---|---|
| 1(1st Area) | 1st | −2.0000E+01 | 1.6800E+00 | 2.4100E−01 |
| 1(1st Area) | 2nd | 0.0000E+00 | −4.0000E+00 | −7.2100E−01 |
| 1(2nd Area) | 1st | −2.0000E+01 | 2.9000E−01 | 6.7700E−02 |
| 1(2nd Area) | 2nd | 0.0000E+00 | −1.7000E+00 | 1.5100E−01 |
| 1(3rd Area) |  | −2.0000E+01 | −4.5400E+00 | −3.5300E−01 |

| Surface No. | OPDF | P8 | P10 | P12 |
|---|---|---|---|---|
| 1(1st Area) | 1st | 3.4050E−02 | 0.0000E+00 | 0.0000E+00 |
| 1(1st Area) | 2nd | −1.5500E−02 | 0.0000E+00 | 0.0000E+00 |
| 1(2nd Area) | 1st | 4.1150E−02 | 0.0000E+00 | 0.0000E+00 |
| 1(2nd Area) | 2nd | 0.0000E+00 | 0.0000E+00 | 0.0000E+00 |
| 1(3rd Area) |  | 0.0000E+00 | 0.0000E+00 | 0.0000E+00 |

TABLE 7

| Surface No. | OPDF | 1st laser beam | 2nd laser beam | 3rd laser beam | hmax |
|---|---|---|---|---|---|
| 1(1st Area) | 1st | 1 | 0 | 0 | 1.250 |
| 1(1st Area) | 2nd | 2 | 1 | 1 |  |
| 1(2nd Area) | 1st | 1 | 0 | — | 1.590 |
| 1(2nd Area) | 2nd | 5 | 3 | — |  |
| 1(3rd Area) |  | 1 | — | — | 2.125 |

As shown in Tables 6 and 7, the annular zone structure in each of the first and second areas of the first surface 11 is formed by combining two types of (first and second) optical path difference functions. The annular zone structure in the third area is formed in accordance with a single type of optical path difference function. As described above, the above described advantages of the embodiment can be achieved by forming the annular zone structure satisfying the above described conditions at least in the first area formed as the common area.

In the first example, $(P_{12} \times f1 + 5.0 \times 10^3 \times (n1-n3))$ of the conditions (1) and (2) takes a value of 106.05. Therefore, the first example satisfies the conditions (1) and (2). By satisfying the conditions (1) and (2), the objective optical system 30 according to the first example achieves both of the function of suitably correcting the longitudinal chromatic aberration during use of the optical disc D1 and the function of securing an adequate working distance WD1 (e.g., an working distance of 0.2 mm or more) during use of the optical disc D3.

Table 8 shows a numeric example of the annular zone structure (phase shift structure) formed in the first area of the first surface 11 of the phase annular zone plate 10 according to the first example. In Table 8, the range of each annular zone formed in the first area of the first surface 11 is indicated. In Table 8 (and in the following similar tables), numbers are assigned to the annular zones in ascending order from the optical axis, the range of each annular zone is represented by the heights hmin and hmax, and optical path length differences $\Delta OPD_{11}/\lambda 1$ and $\Delta OPD_{21}/\lambda 1$ are also shown.

TABLE 8

| Number | hmin | hmax | $\Delta OPD_{11}/\lambda 1$ | $\Delta OPD_{21}/\lambda 1$ |
|---|---|---|---|---|
| 0 | 0.000 | 0.158 |  |  |
| 1 | 0.158 | 0.275 | −0.75 |  |
| 2 | 0.275 | 0.355 | −0.75 |  |
| 3 | 0.355 | 0.422 | −0.75 |  |
| 4 | 0.422 | 0.479 | −0.75 |  |
| 5 | 0.479 | 0.531 | −0.75 |  |
| 6 | 0.531 | 0.579 | −0.75 |  |
| 7 | 0.579 | 0.586 | −0.75 |  |
| 8 | 0.586 | 0.623 |  | −2.00 |
| 9 | 0.623 | 0.665 | −0.75 |  |
| 10 | 0.665 | 0.705 | −0.75 |  |
| 11 | 0.705 | 0.744 | −0.75 |  |
| 12 | 0.744 | 0.763 | −0.75 |  |
| 13 | 0.763 | 0.780 |  | −2.00 |
| 14 | 0.780 | 0.816 | −0.75 |  |
| 15 | 0.816 | 0.851 | −0.75 |  |
| 16 | 0.851 | 0.861 | −0.75 |  |
| 17 | 0.861 | 0.885 |  | −2.00 |
| 18 | 0.885 | 0.918 | −0.75 |  |
| 19 | 0.918 | 0.932 | −0.75 |  |
| 20 | 0.932 | 0.951 |  | −2.00 |
| 21 | 0.951 | 0.983 | −0.75 |  |
| 22 | 0.983 | 0.988 | −0.75 |  |
| 23 | 0.988 | 1.014 |  | −2.00 |
| 24 | 1.014 | 1.035 | −0.75 |  |
| 25 | 1.035 | 1.046 |  | −2.00 |
| 26 | 1.046 | 1.076 | −0.75 |  |
| 27 | 1.076 | 1.108 | −0.75 | −2.00 |
| 28 | 1.108 | 1.111 | −0.75 |  |
| 29 | 1.111 | 1.139 |  | −2.00 |
| 30 | 1.139 | 1.144 | −0.75 |  |
| 31 | 1.144 | 1.173 |  | −2.00 |
| 32 | 1.173 | 1.200 | −0.75 | −2.00 |
| 33 | 1.200 | 1.224 | −0.75 | −2.00 |
| 34 | 1.224 | 1.233 |  | −2.00 |
| 35 | 1.233 | 1.248 | −0.75 |  |
| 36 | 1.248 | 1.250 |  | −2.00 |

As shown in Table 8, the number $N_{11}$ of first steps in the first area is 23, and the value of $(N_{11} \times f1 - 1.25 \times 10^4 (n1-n3))$ of the conditions (4) and (6) is −332.63. Therefore, the first example satisfies the conditions (4) and (6). As shown in Table 8, the objective optical system 30 according to the first example takes the values −0.75 and −2.00 for $\Delta OPD_{11}/\lambda 1$ and $\Delta OPD_{21}/\lambda 1$ concerning the conditions (3) and (5). Therefore, the first example satisfies the conditions (3) and (5). The fact that the objective optical system 30 according to the first example satisfies the conditions (3) to (6) also contributes to achieving both of the function of suitably correcting the longitudinal chromatic aberration during use of the optical disc D1 and the function of securing an adequate working distance WD1 during use of the optical disc D3.

FIG. 3A is a graph illustrating the spherical aberration caused when the first laser beam is used in the optical information recording/reproducing device 100 according to the first example. FIG. 3B is a graph illustrating the spherical aberration caused when the second laser beam is used in the optical information recording/reproducing device 100 according to the first example. FIG. 3C is a graph illustrating the spherical aberration caused when the third laser beam is used in the optical information recording/reproducing device 100 according to the first example.

In each of FIGS. 3A-3C (and in similar graphs in the following examples and comparative examples), a curve indicated by a solid line represents the spherical aberration at the design wavelength, and a curve indicated by a dashed line represents the spherical aberration caused when the wavelength shifts by +5 nm from the design wavelength.

FIGS. 4A-4C illustrates the spherical aberrations caused in a comparative example of an optical information recording/reproducing device. The comparative example has substantially the same structure as the first example, but is configured such that the objective optical system does not satisfy the condition (1). FIG. 4A is a graph illustrating the spherical aberration caused when the first laser beam is used in the optical information recording/reproducing device according to the comparative example. FIG. 4B is a graph illustrating the spherical aberration caused when the second laser beam is used in the optical information recording/reproducing device according to the comparative example. FIG. 4C is a graph illustrating the spherical aberration caused when the third laser beam is used in the optical information recording/reproducing device according to the comparative example.

As can be seen from comparison between FIGS. 3A-3C and FIGS. 4A-4C, the optical information recording/reproducing device 100 according to the first example is able to correct more suitably the longitudinal chromatic aberration caused when the information recording or the information reproducing is performed for the optical disc D1 relative to the comparative example. That is, the optical information recording/reproducing device 10 according to the first example is able to form a suitable beam spot for each of the optical discs D1-D3.

In the first example, the use efficiency of light defined when the first laser beam is used is 79.2%, the use efficiency of light defined when the second laser beam is used is 58.7%, and the use efficiency of light defined when the third laser beam is used is 64.7%.

As described above, the objective optical system 30 according to the first example exhibits excellent optical performance for the information recording and the information reproducing for all of the optical discs D1-D3.

SECOND EXAMPLE

FIGS. 5A-5C show an objective optical system 30a according to a second example. More specifically, FIG. 5A shows a configuration of the objective optical system 30a defined when the optical disc D1 is used, FIG. 5B shows a configuration of the objective optical system 30a defined when the optical disc D2 is used, and FIG. 5C shows a configuration of the objective optical system 30a defined when the optical disc D3 is used.

The objective optical system 30a is constituted by an objective lens 20a on which the annular zone structure which is the same as that formed on the phase annular zone plate 10 is provided. In the second example, the annular zone structure is formed on the first surface 21a of the objective lens 20a. FIG. 12 is a conceptual illustration of the annular zone structure including first to third areas formed on the surface 21a of the objective lens 20a.

In the following, explanations focus on the numerical configuration of the objective optical system 30a for the sake of simplicity. The following Table 9 shows concrete specifications of the objective optical system 30a according to the second example.

TABLE 9

|  | 1$^{st}$ laser beam | 2$^{nd}$ laser beam | 3$^{rd}$ laser beam |
| --- | --- | --- | --- |
| Wavelength (nm) | 405 | 660 | 790 |
| Focal Length (mm) | 2.20 | 2.45 | 2.47 |
| NA | 0.85 | 0.60 | 0.47 |
| Magnification M | 0.000 | 0.000 | 0.000 |

As indicated by the "Magnification M" in Table 9, the laser beam is incident upon the objective optical system 30a as a collimated beam when each of the optical discs D1-D3 is used. With this configuration, it is possible to prevent the off-axis aberration from occurring during the tracking operation.

Table 10 shows a specific numerical configuration defined when the optical disc D1 is used in the optical information recording/reproducing device 100 provided with the objective optical system 30a shown in Table 9. The following Table 11 shows specific numerical configuration defined when the optical disc D2 is used in the optical information recording/reproducing device 100 provided with the objective optical system 30a shown in Table 9. The following Table 12 shows specific numerical configuration defined when the optical disc D3 is used in the optical information recording/reproducing device 100 provided with the objective optical system 30a shown in Table 9.

TABLE 10

| Surface No. | r | d | n(405 nm) |  |
| --- | --- | --- | --- | --- |
| 1(1$^{st}$ Area) | 1.542 | 2.60 | 1.56023 | Objective Lens |
| 1(2$^{nd}$ Area) | 1.542 |  |  |  |
| 1(3$^{rd}$ Area) | 1.542 |  |  |  |
| 2 | −3.844 | 0.64 |  |  |
| 3 | ∞ | 0.10 | 1.62231 | Optical Disc D1 |
| 4 | ∞ | — |  |  |

TABLE 11

| Surface No. | r | d | n(660 nm) |  |
| --- | --- | --- | --- | --- |
| 1(1$^{st}$ Area) | 1.542 | 2.60 | 1.54044 | Objective Lens |
| 1(2$^{nd}$ Area) | 1.542 |  |  |  |
| 1(3$^{rd}$ Area) | 1.542 |  |  |  |
| 2 | −3.844 | 0.62 |  |  |
| 3 | ∞ | 0.60 | 1.57961 | Optical Disc D2 |
| 4 | ∞ | — |  |  |

TABLE 12

| Surface No. | r | d | n(790 nm) |  |
| --- | --- | --- | --- | --- |
| 1(1$^{st}$ Area) | 1.542 | 2.60 | 1.53653 | Objective Lens |
| 1(2$^{nd}$ Area) | 1.542 |  |  |  |
| 1(3$^{rd}$ Area) | 1.542 |  |  |  |
| 2 | −3.844 | 0.25 |  |  |
| 3 | ∞ | 1.20 | 1.57307 | Optical Disc D3 |
| 4 | ∞ | — |  |  |

In the Tables 10-12, the surfaces #1 and #2 represent the first and second surfaces 21a and 22a of the objective lens 20a, and the surfaces #3 and #4 represent the protective layer and the record surface of the corresponding optical disc.

Each of the first and second surfaces 21a and 22a (surfaces #1 and #2) of the objective lens 20a is an aspherical surface. The following Table 13 shows the cone constants K and aspherical coefficients $A_{2i}$ specifying the shape of each of the first and second surfaces 21a and 22a (surfaces #1 and #2) of the objective lens 20a.

TABLE 13

| Surface No. | K | A4 | A6 | A8 | A10 |
|---|---|---|---|---|---|
| 1(1st Area) | −0.7500 | 8.7300E−03 | −1.3500E−04 | 7.5500E−04 | −2.5320E−04 |
| 1(2nd Area) | −0.7500 | 1.0050E−02 | −3.5700E−04 | 1.2490E−03 | −4.3880E−04 |
| 1(3rd Area) | −0.7500 | 7.2600E−03 | 5.9080E−03 | −2.6460E−03 | 6.3150E−04 |
| 2 | 0.0000 | 3.3990E−01 | −6.2800E−01 | 9.4747E−01 | −9.4739E−01 |

| Surface No. | A12 | A14 | A16 | A18 | A20 |
|---|---|---|---|---|---|
| 1(1st Area) | 7.6250E−05 | 0.0000E+00 | 0.0000E+00 | 0.0000E+00 | 0.0000E+00 |
| 1(2nd Area) | 1.0767E−04 | 0.0000E+00 | 0.0000E+00 | 0.0000E+00 | 0.0000E+00 |
| 1(3rd Area) | −1.2530E−05 | 0.0000E+00 | 0.0000E+00 | 0.0000E+00 | 0.0000E+00 |
| 2 | 5.7039E−01 | −1.8690E−01 | 2.5624E−02 | 1.1000E−04 | −9.4830E−05 |

As in the case of the first example, the first surface 21a (surface #1) of the objective lens 20a includes a first area including the optical axis, a second area arranged outside the first area, and a third area arranged outside the second area. The first to third areas are defined by a height h (i.e., an effective radius) from the optical axis as indicated below.

| First Area | $0.000 \leq h \leq 1.160$ |
|---|---|
| Second Area | $1.160 < h \leq 1.470$ |
| Third Area | $1.470 < h \leq 1.870$ |

The first, second and third areas have the same functions as the first to third areas of the first example.

To provide the above described different types of optical effects for the first to third areas, respectively, each of the first to third areas is designed independently to have a unique annular zone structure. In particular, each of the first and second areas has the annular zone structure defined by two types of optical path difference functions different from each other.

Table 14 shows the coefficients $P_{2i}$, $P_{4i}$, $P_{6i}$, . . . of the optical path difference function defining the annular zone structure of each of the first to third areas on the first surface 21a of the objective lens 20a. Table 15 shows the diffraction order m at which the diffraction efficiency for the laser beam is maximized and an effective radius (height from the optical axis) for each of the first to third areas.

TABLE 14

| Surface No. | OPDF | P2 | P4 | P6 |
|---|---|---|---|---|
| 1(1st Area) | 1st | −5.5000E+01 | 3.9700E+00 | −1.1230E+00 |
| 1(1st Area) | 2nd | 0.0000E+00 | −5.7600E+00 | −7.7000E−01 |
| 1(2nd Area) | 1st | −5.5000E+01 | 2.0700E+00 | −1.4060E+00 |
| 1(2nd Area) | 2nd | 0.0000E+00 | −1.6100E+00 | −2.0800E−01 |
| 1(3rd Area) | | −5.5000E+01 | −5.0700E+00 | −2.0000E+00 |

| Surface No. | OPDF | P8 | P10 | P12 |
|---|---|---|---|---|
| 1(1st Area) | 1st | 2.4810E−01 | 0.0000E+00 | 0.0000E+00 |
| 1(1st Area) | 2nd | 0.0000E+00 | 0.0000E+00 | 0.0000E+00 |
| 1(2nd Area) | 1st | 2.3970E−01 | 0.0000E+00 | 0.0000E+00 |
| 1(2nd Area) | 2nd | 0.0000E+00 | 0.0000E+00 | 0.0000E+00 |
| 1(3rd Area) | | 0.0000E+00 | 0.0000E+00 | 0.0000E+00 |

TABLE 15

| Surface No. | OPDF | 1st laser beam | 2nd laser beam | 3rd laser beam | hmax |
|---|---|---|---|---|---|
| 1(1st Area) | 1st | 1 | 0 | 0 | 1.160 |
| 1(1st Area) | 2nd | 2 | 1 | 1 | |
| 1(2nd Area) | 1st | 1 | 0 | — | 1.470 |
| 1(2nd Area) | 2nd | 5 | 3 | — | |
| 1(3rd Area) | | 1 | — | — | 1.870 |

As shown in Tables 14 and 15, the annular zone structure in each of the first and second areas of the first surface 21a is formed by combining two types of (first and second) optical path difference functions. The annular zone structure in the third area is formed in accordance with a single type of optical path difference function. As described above, the above described advantages of the embodiment can be achieved if the annular zone structure satisfying the above described conditions is provided at least in the first area which is formed as the common area.

In the second example, $(P_{12} \times f1 + 5.0 \times 10^3 \times (n1-n3))$ of the conditions (1) and (2) takes a value of −2.50. Therefore, the second example satisfies the conditions (1) and (2). By satisfying the conditions (1) and (2), the objective optical system 30 according to the second example achieves both of the function of suitably correcting the longitudinal chromatic aberration during use of the optical disc D1 and the function of securing an adequate working distance WD2 (see FIG. 5C) during use of the optical disc D3.

Table 16 shows a numeric example of the annular zone structure (phase shift structure) formed in the first area of the first surface 21a of the objective lens 20a according to the second example. In Table 16, the range of each annular zone formed in the first area of the first surface 21a is indicated.

TABLE 16

| Number | hmin | hmax | $\Delta OPD_{11}/\lambda 1$ | $\Delta OPD_{21}/\lambda 1$ |
|---|---|---|---|---|
| 0 | 0.000 | 0.095 | | |
| 1 | 0.095 | 0.165 | −0.64 | |
| 2 | 0.165 | 0.214 | −0.64 | |
| 3 | 0.214 | 0.253 | −0.64 | |
| 4 | 0.253 | 0.287 | −0.64 | |
| 5 | 0.287 | 0.317 | −0.64 | |
| 6 | 0.317 | 0.345 | −0.64 | |
| 7 | 0.345 | 0.371 | −0.64 | |
| 8 | 0.371 | 0.395 | −0.64 | |
| 9 | 0.395 | 0.418 | −0.64 | |
| 10 | 0.418 | 0.440 | −0.64 | |
| 11 | 0.440 | 0.461 | −0.64 | |
| 12 | 0.461 | 0.481 | −0.64 | |
| 13 | 0.481 | 0.500 | −0.64 | |

TABLE 16-continued

| Number | hmin | hmax | $\Delta OPD_{11}/\lambda 1$ | $\Delta OPD_{21}/\lambda 1$ |
|---|---|---|---|---|
| 14 | 0.500 | 0.518 | −0.64 | |
| 15 | 0.518 | 0.538 | −0.64 | |
| 16 | 0.538 | 0.553 | −0.64 | −1.83 |
| 17 | 0.553 | 0.570 | −0.64 | |
| 18 | 0.570 | 0.587 | −0.64 | |
| 19 | 0.587 | 0.603 | −0.64 | |
| 20 | 0.603 | 0.618 | −0.64 | |
| 21 | 0.618 | 0.634 | −0.64 | |
| 22 | 0.634 | 0.648 | −0.64 | |
| 23 | 0.648 | 0.663 | −0.64 | |
| 24 | 0.663 | 0.677 | −0.64 | |
| 25 | 0.677 | 0.691 | −0.64 | |
| 26 | 0.691 | 0.703 | −0.64 | |
| 27 | 0.703 | 0.719 | −0.64 | −1.83 |
| 28 | 0.719 | 0.732 | −0.64 | |
| 29 | 0.732 | 0.745 | −0.64 | |
| 30 | 0.745 | 0.758 | −0.64 | |
| 31 | 0.758 | 0.771 | −0.64 | |
| 32 | 0.771 | 0.784 | −0.64 | |
| 33 | 0.784 | 0.795 | −0.64 | |
| 34 | 0.795 | 0.808 | −0.64 | −1.83 |
| 35 | 0.808 | 0.820 | −0.64 | |
| 36 | 0.820 | 0.832 | −0.64 | |
| 37 | 0.832 | 0.844 | −0.64 | |
| 38 | 0.844 | 0.856 | −0.64 | |
| 39 | 0.856 | 0.862 | −0.64 | |
| 40 | 0.862 | 0.867 | | −1.83 |
| 41 | 0.867 | 0.878 | −0.64 | |
| 42 | 0.878 | 0.890 | −0.64 | |
| 43 | 0.890 | 0.901 | −0.64 | |
| 44 | 0.901 | 0.912 | −0.64 | |
| 45 | 0.912 | 0.916 | −0.64 | |
| 46 | 0.916 | 0.923 | | −1.83 |
| 47 | 0.923 | 0.933 | −0.64 | |
| 48 | 0.933 | 0.944 | −0.64 | |
| 49 | 0.944 | 0.955 | −0.64 | |
| 50 | 0.955 | 0.960 | −0.64 | |
| 51 | 0.960 | 0.965 | | −1.83 |
| 52 | 0.965 | 0.975 | −0.64 | |
| 53 | 0.975 | 0.986 | −0.64 | |
| 54 | 0.986 | 0.996 | −0.64 | |
| 55 | 0.996 | 0.999 | −0.64 | |
| 56 | 0.999 | 1.006 | −0.64 | |
| 57 | 1.006 | 1.016 | −0.64 | |
| 58 | 1.016 | 1.026 | −0.64 | |
| 59 | 1.026 | 1.033 | −0.64 | |
| 60 | 1.033 | 1.046 | −0.64 | −1.83 |
| 61 | 1.046 | 1.055 | −0.64 | |
| 62 | 1.055 | 1.064 | −0.64 | |
| 63 | 1.064 | 1.075 | −0.64 | −1.83 |
| 64 | 1.075 | 1.084 | −0.64 | |
| 65 | 1.084 | 1.092 | −0.64 | |
| 66 | 1.092 | 1.103 | −0.64 | −1.83 |
| 67 | 1.103 | 1.112 | −0.64 | |
| 68 | 1.112 | 1.118 | −0.64 | |
| 69 | 1.118 | 1.121 | | −1.83 |
| 70 | 1.121 | 1.131 | −0.64 | |
| 71 | 1.131 | 1.142 | −0.64 | |
| 72 | 1.142 | 1.149 | −0.64 | −1.83 |
| 73 | 1.149 | 1.160 | −0.64 | |

As shown in Table 16, the number $N_{11}$ of first type steps in the first area is sixty two, and the value of $(N_{11} \times f1 - 1.25 \times 10^4 (n1-n3))$ of the conditions (4) and (6) is −159.85. Therefore, the second example satisfies the conditions (4) and (6). As shown in Table 16, the objective optical system 30a according to the second example takes the value −0.64 and −1.83 for $\Delta OPD_{11}/\lambda 1$ and $\Delta OPD_{21}/\lambda 1$ concerning the conditions (3) and (5). Therefore, the second example satisfies the conditions (3) and (5). The fact that the objective optical system 30a according to the second example satisfies the conditions (3) to (6) also contributes to achieving both of the function of suitably correcting the longitudinal chromatic aberration during use of the optical disc D1 and the function of securing an adequate working distance WD2 during use of the optical disc D3.

FIG. 6A is a graph illustrating the spherical aberration caused when the first laser beam is used in the optical information recording/reproducing device 100 according to the second example. FIG. 6B is a graph illustrating the spherical aberration caused when the second laser beam is used in the optical information recording/reproducing device 100 according to the second example. FIG. 6C is a graph illustrating the spherical aberration caused when the third laser beam is used in the optical information recording/reproducing device 100 according to the second example.

As shown in FIGS. 6A-6C, the optical information recording/reproducing device 100 according to the second example suitably corrects the longitudinal chromatic aberration when the information recording and information reproducing is performed for the optical disc D1. That is, optical information recording/reproducing device 100 according to the second example is able to form a suitable beam spot for each of the optical discs D1-D3.

In the second example, the use efficiency of light defined when the first laser beam is used is 71.2%, the use efficiency of light defined when the second laser beam is used is 63.9%, and the use efficiency of light defined when the third laser beam is used is 69.0%.

As described above, the objective optical system 30a according to the second example exhibits excellent optical performance for the information recording and the information reproducing for all of the optical discs D1-D3.

THIRD EXAMPLE

FIGS. 7A-7C show an objective optical system 30b according to a third example. More specifically, FIG. 7A shows a configuration of the objective optical system 30b defined when the optical disc D1 is used, FIG. 7B shows a configuration of the objective optical system 30b defined when the optical disc D2 is used, and FIG. 7C shows a configuration of the objective optical system 30b defined when the optical disc D3 is used.

The objective optical system 30b is constituted by an objective lens 20b on which the annular zone structure which is the same as that formed on the phase annular zone plate 10 is provided. In the third example, the annular zone structure is formed on the first surface 21b of the objective lens 20b. In the following, explanations focus on the numerical configuration of the objective optical system 30b for the sake of simplicity. The following Table 17 shows concrete specifications of the objective optical system 30a according to the third example.

TABLE 17

| | 1$^{st}$ laser beam | 2$^{nd}$ laser beam | 3$^{rd}$ laser beam |
|---|---|---|---|
| Wavelength (nm) | 405 | 660 | 790 |
| Focal Length (mm) | 2.20 | 2.75 | 2.79 |
| NA | 0.85 | 0.60 | 0.47 |
| Magnification M | 0.000 | 0.000 | 0.000 |

As indicated by the "Magnification M" in Table 17, the laser beam is incident upon the objective optical system 30b as a collimated beam when each of the optical discs D1-D3 is used. With this configuration, it is possible to prevent the off-axis aberration from occurring during the tracking operation.

Table 18 shows a specific numerical configuration defined when the optical disc D1 is used in the optical information recording/reproducing device 100 provided with the objective optical system 30b shown in Table 17. The following Table 19 shows specific numerical configuration defined when the optical disc D2 is used in the optical information The following Table 21 shows the cone constants K and aspherical coefficients $A_{2i}$ specifying the shape of each of the first and second surfaces 21b and 22b (surfaces #1 and #2) of the objective lens 20b.

TABLE 21

| Surface No. | K | A4 | A6 | A8 | A10 |
|---|---|---|---|---|---|
| 1(1st Area) | −0.7000 | 8.0600E−03 | 8.3720E−04 | 3.3690E−04 | −5.8640E−05 |
| 1(2nd Area) | −0.7000 | 8.9400E−03 | 9.9340E−04 | 9.3800E−05 | 1.1050E−05 |
| 1(3rd Area) | −0.7000 | 1.8190E−02 | −8.2960E−03 | 3.9970E−03 | −7.5540E−04 |
| 2 | 0.0000 | 1.2820E−01 | −9.6570E−02 | 1.4300E−02 | 4.9370E−02 |

| Surface No. | A12 | A14 | A16 | A18 | A20 |
|---|---|---|---|---|---|
| 1(1st Area) | 2.3640E−05 | 0.0000E+00 | 0.0000E+00 | 0.0000E+00 | 0.0000E+00 |
| 1(2nd Area) | 1.5880E−05 | 0.0000E+00 | 0.0000E+00 | 0.0000E+00 | 0.0000E+00 |
| 1(3rd Area) | 6.8930E−05 | 0.0000E+00 | 0.0000E+00 | 0.0000E+00 | 0.0000E+00 |
| 2 | −5.3180E−02 | 2.3100E−02 | −3.7050E−03 | 0.0000E+00 | 0.0000E+00 | recording/reproducing device 100 provided with the objective optical system 30b shown in Table 17. The following Table 20 shows specific numerical configuration defined when the optical disc D3 is used in the optical information recording/reproducing device 100 provided with the objective optical system 30b shown in Table 17.

As in the case of the first example, the first surface 21b (surface #1) of the objective lens 20b includes a first area including the optical axis, a second area arranged outside the first area, and a third area arranged outside the second area. The first to third areas are defined by a height h (i.e., an effective radius) from the optical axis as indicated below.

TABLE 18

| Surface No. | r | d | n(405 nm) | |
|---|---|---|---|---|
| 1(1st Area) | 1.665 | 2.40 | 1.65098 | Objective Lens |
| 1(2nd Area) | 1.665 | | | |
| 1(3rd Area) | 1.665 | | | |
| 2 | −79.440 | 0.69 | | |
| 3 | ∞ | 0.10 | 1.62231 | Optical Disc D1 |
| 4 | ∞ | — | | |

| First Area | $0.000 \leq h \leq 1.310$ |
|---|---|
| Second Area | $1.310 < h \leq 1.650$ |
| Third Area | $1.650 < h \leq 1.870$ |

The first, second and third areas have the same functions as the first to third areas of the first example.

To provide the above described different types of optical effects for the first to third areas, respectively, each of the first to third areas is designed independently to have a unique annular zone structure. In particular, each of the first and second areas has the annular zone structure defined by two types of optical path difference functions different from each other.

TABLE 19

| Surface No. | r | d | n(660 nm) | |
|---|---|---|---|---|
| 1(1st Area) | 1.665 | 2.40 | 1.59978 | Objective Lens |
| 1(2nd Area) | 1.665 | | | |
| 1(3rd Area) | 1.665 | | | |
| 2 | −79.440 | 0.88 | | |
| 3 | ∞ | 0.60 | 1.57961 | Optical Disc D2 |
| 4 | ∞ | — | | |

Table 22 shows the coefficients $P_{2i}, P_{4i}, P_{6i}, \ldots$ of the optical path difference function defining the annular zone structure of each of the first to third areas on the first surface 21b of the objective lens 20b. Table 23 shows the diffraction order m at which the diffraction efficiency for the laser beam is maximized and an effective radius (height from the optical axis) for each of the first to third areas.

TABLE 20

| Surface No. | r | d | n(790 nm) | |
|---|---|---|---|---|
| 1(1st Area) | 1.665 | 2.40 | 1.59073 | Objective Lens |
| 1(2nd Area) | 1.665 | | | |
| 1(3rd Area) | 1.665 | | | |
| 2 | −79.440 | 0.53 | | |
| 3 | ∞ | 1.20 | 1.57307 | Optical Disc D3 |
| 4 | ∞ | — | | |

TABLE 22

| Surface No. | OPDF | P2 | P4 | P6 |
|---|---|---|---|---|
| 1(1st Area) | 1st | −7.5000E+01 | 9.7400E−01 | −3.1200E−01 |
| 1(1st Area) | 2nd | 0.0000E+00 | −3.6700E+00 | −5.0200E−01 |
| 1(2nd Area) | 1st | −7.5000E+01 | −5.9000E−02 | −6.3560E−01 |
| 1(2nd Area) | 2nd | 0.0000E+00 | −9.0400E−01 | −2.4600E−01 |
| 1(3rd Area) | | −7.5000E+01 | −7.7000E−01 | −3.4850E+00 |

| Surface No. | OPDF | P8 | P10 | P12 |
|---|---|---|---|---|
| 1(1st Area) | 1st | −1.5770E−01 | 0.0000E+00 | 0.0000E+00 |
| 1(1st Area) | 2nd | 0.0000E+00 | 0.0000E+00 | 0.0000E+00 |
| 1(2nd Area) | 1st | −1.2870E−01 | 0.0000E+00 | 0.0000E+00 |
| 1(2nd Area) | 2nd | 0.0000E+00 | 0.0000E+00 | 0.0000E+00 |
| 1(3rd Area) | | 0.0000E+00 | 0.0000E+00 | 0.0000E+00 |

In the Tables 18-20, the surfaces #1 and #2 represent the first and second surfaces 21b and 22b of the objective lens 20b, and the surfaces #3 and #4 represent the protective layer and the record surface of the corresponding optical disc.

Each of the first and second surfaces 21b and 22b (surfaces #1 and #2) of the objective lens 20b is an aspherical surface.

TABLE 23

| Surface No. | OPDF | 1st laser beam | 2nd laser beam | 3rd laser beam | hmax |
|---|---|---|---|---|---|
| 1(1st Area) | 1st | 1 | 0 | 0 | 1.310 |
| 1(1st Area) | 2nd | 2 | 1 | 1 | |
| 1(2nd Area) | 1st | 1 | 0 | — | 1.650 |
| 1(2nd Area) | 2nd | 5 | 3 | — | |
| 1(3rd Area) | | 1 | — | — | 1.870 |

As shown in Tables 22 and 23, the annular zone structure in each of the first and second areas of the first surface 21b is formed by combining two types of (first and second) optical path difference functions. The annular zone structure in the third area is formed in accordance with a single type of optical path difference function. As described above, the above described advantages of the embodiment can be achieved if the annular zone structure satisfying the above described conditions is provided at least in the first area which is formed as the common area.

In the third example, $(P_{12} \times f1 + 5.0 \times 10^3 \times (n1-n3))$ of the conditions (1) and (2) takes a value of 136.25. Therefore, the third example satisfies the conditions (1) and (2). By satisfying the conditions (1) and (2), the objective optical system 30b according to the third example achieves both of the function of suitably correcting the longitudinal chromatic aberration during use of the optical disc D1 and the function of securing an adequate working distance WD3 (see FIG. 7C) during use of the optical disc D3.

Table 24 shows a numeric example of the annular zone structure (phase shift structure) formed in the first area of the first surface 21b of the objective lens 20b according to the third example. In Table 24, the range of each annular zone formed in the first area of the first surface 21b is indicated.

TABLE 24

| Number | hmin | hmax | $\Delta OPD_{11}/\lambda 1$ | $\Delta OPD_{21}/\lambda 1$ |
|---|---|---|---|---|
| 0 | 0.000 | 0.082 | | |
| 1 | 0.082 | 0.141 | −0.53 | |
| 2 | 0.141 | 0.183 | −0.53 | |
| 3 | 0.183 | 0.216 | −0.53 | |
| 4 | 0.216 | 0.245 | −0.53 | |
| 5 | 0.245 | 0.271 | −0.53 | |
| 6 | 0.271 | 0.295 | −0.53 | |
| 7 | 0.295 | 0.316 | −0.53 | |
| 8 | 0.316 | 0.337 | −0.53 | |
| 9 | 0.337 | 0.356 | −0.53 | |
| 10 | 0.356 | 0.374 | −0.53 | |
| 11 | 0.374 | 0.392 | −0.53 | |
| 12 | 0.392 | 0.409 | −0.53 | |
| 13 | 0.409 | 0.425 | −0.53 | |
| 14 | 0.425 | 0.440 | −0.53 | |
| 15 | 0.440 | 0.455 | −0.53 | |
| 16 | 0.455 | 0.470 | −0.53 | |
| 17 | 0.470 | 0.484 | −0.53 | |
| 18 | 0.484 | 0.497 | −0.53 | |
| 19 | 0.497 | 0.511 | −0.53 | |
| 20 | 0.511 | 0.524 | −0.53 | |
| 21 | 0.524 | 0.536 | −0.53 | |
| 22 | 0.536 | 0.549 | −0.53 | |
| 23 | 0.549 | 0.561 | −0.53 | |
| 24 | 0.561 | 0.573 | −0.53 | |
| 25 | 0.573 | 0.584 | −0.53 | |
| 26 | 0.584 | 0.596 | −0.53 | |
| 27 | 0.596 | 0.600 | −0.53 | |
| 28 | 0.600 | 0.607 | | −2.07 |
| 29 | 0.607 | 0.618 | −0.53 | |
| 30 | 0.618 | 0.629 | −0.53 | |
| 31 | 0.629 | 0.639 | −0.53 | |
| 32 | 0.639 | 0.650 | −0.53 | |
| 33 | 0.650 | 0.660 | −0.53 | |
| 34 | 0.660 | 0.670 | −0.53 | |
| 35 | 0.670 | 0.680 | −0.53 | |
| 36 | 0.680 | 0.690 | −0.53 | |
| 37 | 0.690 | 0.699 | −0.53 | |
| 38 | 0.699 | 0.709 | −0.53 | |
| 39 | 0.709 | 0.718 | −0.53 | |
| 40 | 0.718 | 0.728 | −0.53 | |
| 41 | 0.728 | 0.737 | −0.53 | |
| 42 | 0.737 | 0.746 | −0.53 | |
| 43 | 0.746 | 0.755 | −0.53 | |
| 44 | 0.755 | 0.764 | −0.53 | |
| 45 | 0.764 | 0.773 | −0.53 | |
| 46 | 0.773 | 0.784 | −0.53 | |
| 47 | 0.784 | 0.790 | −0.53 | −2.07 |
| 48 | 0.790 | 0.798 | −0.53 | |
| 49 | 0.798 | 0.807 | −0.53 | |
| 50 | 0.807 | 0.815 | −0.53 | |
| 51 | 0.815 | 0.823 | −0.53 | |
| 52 | 0.823 | 0.831 | −0.53 | |
| 53 | 0.831 | 0.839 | −0.53 | |
| 54 | 0.839 | 0.847 | −0.53 | |
| 55 | 0.847 | 0.855 | −0.53 | |
| 56 | 0.855 | 0.863 | −0.53 | |
| 57 | 0.863 | 0.871 | −0.53 | |
| 58 | 0.871 | 0.878 | −0.53 | |
| 59 | 0.878 | 0.886 | −0.53 | |
| 60 | 0.886 | 0.894 | −0.53 | −2.07 |
| 61 | 0.894 | 0.901 | −0.53 | |
| 62 | 0.901 | 0.909 | −0.53 | |
| 63 | 0.909 | 0.916 | −0.53 | |
| 64 | 0.916 | 0.923 | −0.53 | |
| 65 | 0.923 | 0.931 | −0.53 | |
| 66 | 0.931 | 0.938 | −0.53 | |
| 67 | 0.938 | 0.945 | −0.53 | |
| 68 | 0.945 | 0.952 | −0.53 | |
| 69 | 0.952 | 0.959 | −0.53 | |
| 70 | 0.959 | 0.966 | −0.53 | −2.07 |
| 71 | 0.966 | 0.973 | −0.53 | |
| 72 | 0.973 | 0.980 | −0.53 | |
| 73 | 0.980 | 0.987 | −0.53 | |
| 74 | 0.987 | 0.993 | −0.53 | |
| 75 | 0.993 | 1.000 | −0.53 | |
| 76 | 1.000 | 1.007 | −0.53 | |
| 77 | 1.007 | 1.013 | −0.53 | |
| 78 | 1.013 | 1.018 | −0.53 | |
| 79 | 1.018 | 1.026 | −0.53 | −2.07 |
| 80 | 1.026 | 1.033 | −0.53 | |
| 81 | 1.033 | 1.039 | −0.53 | |
| 82 | 1.039 | 1.046 | −0.53 | |
| 83 | 1.046 | 1.052 | −0.53 | |
| 84 | 1.052 | 1.059 | −0.53 | |
| 85 | 1.059 | 1.065 | −0.53 | |
| 86 | 1.065 | 1.067 | −0.53 | |
| 87 | 1.067 | 1.071 | | −2.07 |
| 88 | 1.071 | 1.077 | −0.53 | |
| 89 | 1.077 | 1.083 | −0.53 | |
| 90 | 1.083 | 1.090 | −0.53 | |
| 91 | 1.090 | 1.096 | −0.53 | |
| 92 | 1.096 | 1.102 | −0.53 | |
| 93 | 1.102 | 1.110 | −0.53 | |
| 94 | 1.110 | 1.114 | −0.53 | −2.07 |
| 95 | 1.114 | 1.120 | −0.53 | |
| 96 | 1.120 | 1.126 | −0.53 | |
| 97 | 1.126 | 1.131 | −0.53 | |
| 98 | 1.131 | 1.137 | −0.53 | |
| 99 | 1.137 | 1.143 | −0.53 | |
| 100 | 1.143 | 1.147 | −0.53 | |
| 101 | 1.147 | 1.155 | −0.53 | −2.07 |
| 102 | 1.155 | 1.160 | −0.53 | |
| 103 | 1.160 | 1.166 | −0.53 | |
| 104 | 1.166 | 1.172 | −0.53 | |
| 105 | 1.172 | 1.177 | −0.53 | |
| 106 | 1.177 | 1.181 | −0.53 | |
| 107 | 1.181 | 1.188 | −0.53 | −2.07 |
| 108 | 1.188 | 1.194 | −0.53 | |
| 109 | 1.194 | 1.200 | −0.53 | |
| 110 | 1.200 | 1.205 | −0.53 | |
| 111 | 1.205 | 1.212 | −0.53 | |

TABLE 24-continued

| Number | hmin | hmax | $\Delta OPD_{11}/\lambda 1$ | $\Delta OPD_{21}/\lambda 1$ |
|---|---|---|---|---|
| 112 | 1.212 | 1.216 | −0.53 | −2.07 |
| 113 | 1.216 | 1.221 | −0.53 | |
| 114 | 1.221 | 1.227 | −0.53 | |
| 115 | 1.227 | 1.232 | −0.53 | |
| 116 | 1.232 | 1.237 | −0.53 | |
| 117 | 1.237 | 1.240 | −0.53 | |
| 118 | 1.240 | 1.248 | −0.53 | −2.07 |
| 119 | 1.248 | 1.253 | −0.53 | |
| 120 | 1.253 | 1.258 | −0.53 | |
| 121 | 1.258 | 1.263 | −0.53 | |
| 122 | 1.263 | 1.266 | −0.53 | |
| 123 | 1.266 | 1.274 | −0.53 | −2.07 |
| 124 | 1.274 | 1.279 | −0.53 | |
| 125 | 1.279 | 1.284 | −0.53 | |
| 126 | 1.284 | 1.291 | −0.53 | |
| 127 | 1.291 | 1.294 | −0.53 | −2.07 |
| 128 | 1.294 | 1.299 | −0.53 | |
| 129 | 1.299 | 1.304 | −0.53 | |
| 130 | 1.304 | 1.310 | −0.53 | |

As shown in Table 24, the number $N_{11}$ of first type steps in the first area is 117, and the value of $(N_{11} \times f1 - 1.25 \times 10^4(n1-n3))$ of the conditions (4) and (6) is −495.73. Therefore, the third example satisfies the condition (4). As shown in Table 24, the objective optical system 30b according to the third example takes the value −0.53 and −2.07 for $\Delta OPD_{11}/\lambda 1$ and $\Delta OPD_{21}/\lambda 1$ concerning the conditions (3) and (5). Therefore, the third example satisfies the conditions (3) and (5). The fact that the objective optical system 30b according to the third example satisfies the conditions (3) to (5) also contributes to achieving both of the function of suitably correcting the longitudinal chromatic aberration during use of the optical disc D1 and the function of securing an adequate working distance WD3 during use of the optical disc D3.

FIG. 8A is a graph illustrating the spherical aberration caused when the first laser beam is used in the optical information recording/reproducing device 100 according to the third example. FIG. 8B is a graph illustrating the spherical aberration caused when the second laser beam is used in the optical information recording/reproducing device 100 according to the third example. FIG. 8C is a graph illustrating the spherical aberration caused when the third laser beam is used in the optical information recording/reproducing device 100 according to the third example.

As shown in FIGS. 8A-8C, the optical information recording/reproducing device 100 according to the third example suitably corrects the longitudinal chromatic aberration when the information recording and information reproducing is performed for the optical disc D1. That is, optical information recording/reproducing device 100 according to the third example is able to form a suitable beam spot for each of the optical discs D1-D3.

In the third example, the use efficiency of light defined when the first laser beam is used is 63.4%, the use efficiency of light defined when the second laser beam is used is 61.6%, and the use efficiency of light defined when the third laser beam is used is 80.9%.

As described above, the objective optical system 30a according to the second example exhibits excellent optical performance for the information recording and the information reproducing for all of the optical discs D1-D3.

FOURTH EXAMPLE

FIGS. 9A-9C show an objective optical system 30c according to a fourth example. More specifically, FIG. 9A shows a configuration of the objective optical system 30c defined when the optical disc D1 is used, FIG. 9B shows a configuration of the objective optical system 30c defined when the optical disc D2 is used, and FIG. 9C shows a configuration of the objective optical system 30c defined when the optical disc D3 is used.

The objective optical system 30c is constituted by an objective lens 20c. The objective lens 20c is configured such that at least one surface is provided with the annular zone structure which is the same as that formed on the phase annular zone plate 10. In the fourth example, the annular zone structure is formed on the first surface 21c of the objective lens 20c. In the following, explanations focus on the numerical configuration of the objective optical system 30c for the sake of simplicity. The following Table 25 shows concrete specifications of the objective optical system 30c according to the fourth example.

TABLE 25

| | $1^{st}$ laser beam | $2^{nd}$ laser beam | $3^{rd}$ laser beam |
|---|---|---|---|
| Wavelength (nm) | 405 | 660 | 790 |
| Focal Length (mm) | 2.20 | 2.60 | 2.62 |
| NA | 0.85 | 0.60 | 0.47 |
| Magnification M | 0.000 | 0.000 | 0.000 |

As indicated by the "Magnification M" in Table 27, the laser beam is incident upon the objective optical system 30c as a collimated beam when each of the optical discs D1-D3 is used. With this configuration, it is possible to prevent the off-axis aberration from occurring during the tracking operation.

Table 26 shows a specific numerical configuration defined when the optical disc D1 is used in the optical information recording/reproducing device 100 provided with the objective optical system 30c shown in Table 25. The following Table 27 shows specific numerical configuration defined when the optical disc D2 is used in the optical information recording/reproducing device 100 provided with the objective optical system 30c shown in Table 25. The following Table 28 shows specific numerical configuration defined when the optical disc D3 is used in the optical information recording/reproducing device 100 provided with the objective optical system 30c shown in Table 25.

TABLE 26

| Surface No. | r | d | n(405 nm) | |
|---|---|---|---|---|
| 1($1^{st}$ Area) | 1.632 | 2.50 | 1.62309 | Objective Lens |
| 1($2^{nd}$ Area) | 1.632 | | | |
| 1($3^{rd}$ Area) | 1.632 | | | |
| 2 | −10.254 | 0.67 | | |
| 3 | ∞ | 0.10 | 1.62231 | Optical Disc D1 |
| 4 | ∞ | — | | |

TABLE 27

| Surface No. | r | d | n(660 nm) | |
|---|---|---|---|---|
| 1($1^{st}$ Area) | 1.632 | 2.50 | 1.58760 | Objective Lens |
| 1($2^{nd}$ Area) | 1.632 | | | |
| 1($3^{rd}$ Area) | 1.632 | | | |
| 2 | −10.254 | 0.75 | | |
| 3 | ∞ | 0.60 | 1.57961 | Optical Disc D2 |
| 4 | ∞ | — | | |

TABLE 28

| Surface No. | r | d | n(790 nm) | |
|---|---|---|---|---|
| 1(1$^{st}$ Area) | 1.632 | 2.50 | 1.58169 | Objective Lens |
| 1(2$^{nd}$ Area) | 1.632 | | | |
| 1(3$^{rd}$ Area) | 1.632 | | | |
| 2 | −10.254 | 0.38 | | |
| 3 | ∞ | 1.20 | 1.57307 | Optical Disc D3 |
| 4 | ∞ | — | | |

In the Tables 26-28, the surfaces #1 and #2 represent the first and second surfaces 21c and 22c of the objective lens 20c, and the surfaces #3 and #4 represent the protective layer and the record surface of the corresponding optical disc.

Each of the first and second surfaces 21c and 22c (surfaces #1 and #2) of the objective lens 20c is an aspherical surface. The following Table 29 shows the cone constants K and aspherical coefficients $A_{2i}$ specifying the shape of each of the first and second surfaces 21c and 22c (surfaces #1 and #2) of the objective lens 20c.

TABLE 29

| Surface No. | K | A4 | A6 | A8 | A10 |
|---|---|---|---|---|---|
| 1(1$^{st}$ Area) | −0.7000 | 7.6400E−03 | 3.3210E−04 | 3.6220E−04 | −5.7300E−05 |
| 1(2$^{nd}$ Area) | −0.7000 | 8.4620E−03 | 5.1840E−04 | 4.3870E−04 | −9.1720E−05 |
| 1(3$^{rd}$ Area) | −0.7000 | 3.5130E−03 | 9.8020E−03 | −4.7040E−03 | 1.1376E−03 |
| 2 | 0.0000 | 1.9910E−01 | −2.6190E−01 | 2.6600E−01 | −2.0310E−01 |

| Surface No. | A12 | A14 | A16 | A18 | A20 |
|---|---|---|---|---|---|
| 1(1$^{st}$ Area) | 2.1633E−05 | 0.0000E+00 | 0.0000E+00 | 0.0000E+00 | 0.0000E+00 |
| 1(2$^{nd}$ Area) | 3.1370E−05 | 0.0000E+00 | 0.0000E+00 | 0.0000E+00 | 0.0000E+00 |
| 1(3$^{rd}$ Area) | −8.1305E−05 | 0.0000E+00 | 0.0000E+00 | 0.0000E+00 | 0.0000E+00 |
| 2 | 1.1120E−01 | −3.9880E−02 | 6.9680E−03 | 0.0000E+00 | 0.0000E+00 |

As in the case of the first example, the first surface 21c (surface #1) of the objective lens 20c includes a first area including the optical axis, a second area arranged outside the first area, and a third area arranged outside the second area. The first to third areas are defined by a height h (i.e., an effective radius) from the optical axis as indicated below.

| First Area | 0.000 ≦ h ≦ 1.230 |
|---|---|
| Second Area | 1.230 < h ≦ 1.560 |
| Third Area | 1.5600 < h ≦ 1.870 |

The first, second and third areas have the same functions as the first to third areas of the first example.

To provide the above described different types of optical effects for the first to third areas, respectively, each of the first to third areas is designed independently to have a unique annular zone structure. In particular, each of the first and second areas has the annular zone structure defined by two types of optical path difference functions different from each other.

Table 30 shows the coefficients $P_{2i}$, $P_{4i}$, $P_{6i}$, ... of the optical path difference function defining the annular zone structure of each of the first to third areas on the first surface 21c of the objective lens 20c. Table 31 shows the diffraction order m at which the diffraction efficiency for the laser beam is maximized and an effective radius (height from the optical axis) for each of the first to third areas.

TABLE 30

| Surface No. | OPDF | P2 | P4 | P6 |
|---|---|---|---|---|
| 1(1$^{st}$ Area) | 1$^{st}$ | −6.5000E+01 | 2.5960E+00 | −7.4380E−01 |
| 1(1$^{st}$ Area) | 2$^{nd}$ | 0.0000E+00 | −4.5850E+00 | −6.2930E−01 |
| 1(2$^{nd}$ Area) | 1$^{st}$ | −6.5000E+01 | 5.6580E−01 | −1.1490E+00 |
| 1(2$^{nd}$ Area) | 2$^{nd}$ | 0.0000E+00 | −1.9260E+00 | −2.4770E−01 |
| 1(3$^{rd}$ Area) | | −6.5000E+01 | −2.7840E+00 | −2.3670E+01 |

| Surface No. | OPDF | P8 | P10 | P12 |
|---|---|---|---|---|
| 1(1$^{st}$ Area) | 1$^{st}$ | 2.7210E−02 | 0.0000E+00 | 0.0000E+00 |
| 1(1$^{st}$ Area) | 2$^{nd}$ | 0.0000E+00 | 0.0000E+00 | 0.0000E+00 |
| 1(2$^{nd}$ Area) | 1$^{st}$ | 4.0540E−02 | 0.0000E+00 | 0.0000E+00 |
| 1(2$^{nd}$ Area) | 2$^{nd}$ | 0.0000E+00 | 0.0000E+00 | 0.0000E+00 |
| 1(3$^{rd}$ Area) | | 0.0000E+00 | 0.0000E+00 | 0.0000E+00 |

TABLE 31

| Surface No. | OPDF | 1$^{st}$ laser beam | 2$^{nd}$ laser beam | 3$^{rd}$ laser beam | hmax |
|---|---|---|---|---|---|
| 1(1$^{st}$ Area) | 1$^{st}$ | 1 | 0 | 0 | 1.230 |
| 1(1$^{st}$ Area) | 2$^{nd}$ | 2 | 1 | 1 | |
| 1(2$^{nd}$ Area) | 1$^{st}$ | 1 | 0 | — | 1.560 |
| 1(2$^{nd}$ Area) | 2$^{nd}$ | 3 | 2 | — | |
| 1(3$^{rd}$ Area) | | 1 | — | — | 1.870 |

As shown in Tables 30 and 31, the annular zone structure in each of the first and second areas of the first surface 21c is formed by combining two types of (first and second) optical path difference functions. The annular zone structure in the third area is formed in accordance with a single type of optical path difference function. As described above, the above described advantages of the embodiment can be achieved if the annular zone structure satisfying the above described conditions is provided at least in the first area which is formed as the common area.

In the fourth example, $(P_{12} \times f1 + 5.0 \times 10^3 \times (n1-n3))$ of the conditions (1) and (2) takes a value of 64.00. Therefore, the fourth example satisfies the conditions (1) and (2). By satisfying the conditions (1) and (2), the objective optical system 30c according to the fourth example achieves both of the function of suitably correcting the longitudinal chromatic aberration during use of the optical disc D1 and the function of securing an adequate working distance WD4 (see FIG. 9C) during use of the optical disc D3.

Table 32 shows a numeric example of the annular zone structure (phase shift structure) formed in the first area of the first surface 21c of the objective lens 20c according to the fourth example. In Table 32, the range of each annular zone formed in the first area of the first surface 21c is indicated.

TABLE 32

| Number | hmin | hmax | $\Delta OPD_{11}/\lambda 1$ | $\Delta OPD_{21}/\lambda 1$ |
|---|---|---|---|---|
| 0 | 0.000 | 0.088 | | |
| 1 | 0.088 | 0.152 | −0.62 | |
| 2 | 0.152 | 0.196 | −0.62 | |
| 3 | 0.196 | 0.232 | −0.62 | |
| 4 | 0.232 | 0.263 | −0.62 | |
| 5 | 0.263 | 0.291 | −0.62 | |
| 6 | 0.291 | 0.317 | −0.62 | |
| 7 | 0.317 | 0.340 | −0.62 | |
| 8 | 0.340 | 0.363 | −0.62 | |
| 9 | 0.363 | 0.383 | −0.62 | |
| 10 | 0.383 | 0.403 | −0.62 | |
| 11 | 0.403 | 0.422 | −0.62 | |
| 12 | 0.422 | 0.440 | −0.62 | |
| 13 | 0.440 | 0.458 | −0.62 | |
| 14 | 0.458 | 0.474 | −0.62 | |
| 15 | 0.474 | 0.491 | −0.62 | |
| 16 | 0.491 | 0.506 | −0.62 | |
| 17 | 0.506 | 0.521 | −0.62 | |
| 18 | 0.521 | 0.536 | −0.62 | |
| 19 | 0.536 | 0.551 | −0.62 | |
| 20 | 0.551 | 0.565 | −0.62 | |
| 21 | 0.565 | 0.568 | −0.62 | |
| 22 | 0.568 | 0.579 | | −1.82 |
| 23 | 0.579 | 0.592 | −0.62 | |
| 24 | 0.592 | 0.605 | −0.62 | |
| 25 | 0.605 | 0.618 | −0.62 | |
| 26 | 0.618 | 0.631 | −0.62 | |
| 27 | 0.631 | 0.643 | −0.62 | |
| 28 | 0.643 | 0.655 | −0.62 | |
| 29 | 0.655 | 0.667 | −0.62 | |
| 30 | 0.667 | 0.679 | −0.62 | |
| 31 | 0.679 | 0.691 | −0.62 | |
| 32 | 0.691 | 0.702 | −0.62 | |
| 33 | 0.702 | 0.713 | −0.62 | |
| 34 | 0.713 | 0.724 | −0.62 | |
| 35 | 0.724 | 0.735 | −0.62 | |
| 36 | 0.735 | 0.743 | −0.62 | |
| 37 | 0.743 | 0.746 | | −1.82 |
| 38 | 0.746 | 0.757 | −0.62 | |
| 39 | 0.757 | 0.767 | −0.62 | |
| 40 | 0.767 | 0.777 | −0.62 | |
| 41 | 0.777 | 0.788 | −0.62 | |
| 42 | 0.788 | 0.798 | −0.62 | |
| 43 | 0.798 | 0.808 | −0.62 | |
| 44 | 0.808 | 0.818 | −0.62 | |
| 45 | 0.818 | 0.827 | −0.62 | |
| 46 | 0.827 | 0.837 | −0.62 | |
| 47 | 0.837 | 0.840 | −0.62 | |
| 48 | 0.840 | 0.846 | | −1.82 |
| 49 | 0.846 | 0.856 | −0.62 | |
| 50 | 0.856 | 0.865 | −0.62 | |
| 51 | 0.865 | 0.874 | −0.62 | |
| 52 | 0.874 | 0.884 | −0.62 | |
| 53 | 0.884 | 0.893 | −0.62 | |
| 54 | 0.893 | 0.902 | −0.62 | |
| 55 | 0.902 | 0.910 | −0.62 | −1.82 |
| 56 | 0.910 | 0.919 | −0.62 | |
| 57 | 0.919 | 0.928 | −0.62 | |
| 58 | 0.928 | 0.937 | −0.62 | |
| 59 | 0.937 | 0.945 | −0.62 | |
| 60 | 0.945 | 0.954 | −0.62 | |
| 61 | 0.954 | 0.962 | −0.62 | |
| 62 | 0.962 | 0.966 | −0.62 | |
| 63 | 0.966 | 0.970 | | −1.82 |
| 64 | 0.970 | 0.979 | −0.62 | |
| 65 | 0.979 | 0.987 | −0.62 | |
| 66 | 0.987 | 0.995 | −0.62 | |
| 67 | 0.995 | 1.003 | −0.62 | |
| 68 | 1.003 | 1.011 | −0.62 | |
| 69 | 1.011 | 1.013 | −0.62 | |
| 70 | 1.013 | 1.019 | | −1.82 |
| 71 | 1.019 | 1.027 | −0.62 | |
| 72 | 1.027 | 1.035 | −0.62 | |
| 73 | 1.035 | 1.043 | −0.62 | |
| 74 | 1.043 | 1.050 | −0.62 | |
| 75 | 1.050 | 1.053 | −0.62 | |
| 76 | 1.053 | 1.058 | | −1.82 |
| 77 | 1.058 | 1.066 | −0.62 | |
| 78 | 1.066 | 1.073 | −0.62 | |
| 79 | 1.073 | 1.081 | −0.62 | |
| 80 | 1.081 | 1.088 | −0.62 | |
| 81 | 1.088 | 1.089 | −0.62 | |
| 82 | 1.089 | 1.096 | | −1.82 |
| 83 | 1.096 | 1.103 | −0.62 | |
| 84 | 1.103 | 1.110 | −0.62 | |
| 85 | 1.110 | 1.117 | −0.62 | |
| 86 | 1.117 | 1.121 | −0.62 | |
| 87 | 1.121 | 1.125 | | −1.82 |
| 88 | 1.125 | 1.132 | −0.62 | |
| 89 | 1.132 | 1.139 | −0.62 | |
| 90 | 1.139 | 1.146 | −0.62 | |
| 91 | 1.146 | 1.151 | −0.62 | |
| 92 | 1.151 | 1.153 | | −1.82 |
| 93 | 1.153 | 1.160 | −0.62 | |
| 94 | 1.160 | 1.167 | −0.62 | |
| 95 | 1.167 | 1.174 | −0.62 | |
| 96 | 1.174 | 1.178 | −0.62 | |
| 97 | 1.178 | 1.181 | | −1.82 |
| 98 | 1.181 | 1.188 | −0.62 | |
| 99 | 1.188 | 1.194 | −0.62 | |
| 100 | 1.194 | 1.201 | −0.62 | |
| 101 | 1.201 | 1.203 | −0.62 | |
| 102 | 1.203 | 1.208 | | −1.82 |
| 103 | 1.208 | 1.215 | −0.62 | |
| 104 | 1.215 | 1.221 | −0.62 | |
| 105 | 1.221 | 1.230 | −0.62 | |

As shown in Table 32, the number $N_{11}$ of first type steps in the first area is 93, and the value of $(N_{11} \times f1 - 1.25 \times 10^4 (n1-n3))$ of the conditions (4) and (6) is −312.90. Therefore, the fourth example satisfies the conditions (4) and (6). As shown in Table 32, the objective optical system 30c according to the fourth example takes the value −0.62 and −1.82 for $\Delta OPD_{11}/\lambda 1$ and $\Delta OPD_{21}/\lambda 1$ concerning the conditions (3) and (5). Therefore, the fourth example satisfies the conditions (3) and (5). The fact that the objective optical system 30c according to the fourth example satisfies the conditions (3) to (6) also contributes to achieving both of the function of suitably correcting the longitudinal chromatic aberration during use of the optical disc D1 and the function of securing an adequate working distance WD4 during use of the optical disc D3.

FIG. 10A is a graph illustrating the spherical aberration caused when the first laser beam is used in the optical information recording/reproducing device 100 according to the fourth example. FIG. 10B is a graph illustrating the spherical aberration caused when the second laser beam is used in the optical information recording/reproducing device 100 according to the fourth example. FIG. 10C is a graph illustrating the spherical aberration caused when the third laser beam is used in the optical information recording/reproducing device 100 according to the fourth example.

As shown in FIGS. 8A-8C, the optical information recording/reproducing device 100 according to the fourth example suitably corrects the longitudinal chromatic aberration when the information recording and information reproducing is performed for the optical disc D1. That is, optical information recording/reproducing device 100 according to the fourth example is able to form a suitable beam spot for each of the optical discs D1-D3.

In the third example, the use efficiency of light defined when the first laser beam is used is 66.3%, the use efficiency of light defined when the second laser beam is used is 63.5%, and the use efficiency of light defined when the third laser beam is used is 69.9%.

As described above, the objective optical system 30c according to the fourth example exhibits excellent optical performance for the information recording and the information reproducing for all of the optical discs D1-D3.

Although the present invention has been described in considerable detail with reference to certain preferred embodiments thereof, other embodiments are possible.

As a variation of the first example, the annular zone structure may be formed on the second surface 12 of the phase annular zone plate 10. Alternatively, both of the surfaces 11 and 12 of the phase annular zone plate 10 may be provided with annular zone structures. In addition to forming an annular zone structure on the phase annular zone plate 10, an annular zone structure may be formed on the objective lens 20. For example, a diffraction structure defined by an optical path difference function of a first type may be provided on one of the surfaces of the phase annular zone structure, and a diffraction structure defined by an optical path difference function of a second type may be formed on one of the surfaces of the objective lens 20 (preferably on the first surface 21 of the objective lens 20).

This application claims priority of Japanese Patent Applications Nos. P2008-011493, filed on Jan. 22, 2008 and P2008-259796, filed on Oct. 6, 2008. The entire subject matter of the applications is incorporated herein by reference.

What is claimed is:

1. An objective optical system used for an optical information recording/reproducing device for recording information to and/or reproducing information from three types of optical discs, by selectively using one of three types of substantially collimated light beams including a first light beam having a first wavelength $\lambda_1$ (nm), a second light beam having a second wavelength $\lambda_2$ (nm) and a third light beam having a third wavelength $\lambda_3$ (nm), the three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam, the first, second and third wavelengths $\lambda_1$, $\lambda_2$ and $\lambda_3$ satisfying a condition:

$$\lambda_1 < \lambda_2 < \lambda_3,$$

when protective layer thicknesses of the first, second and third optical discs are represented by t1 (mm), t2 (mm) and t3 (mm), respectively, the protective layer thicknesses satisfy following relationships:

$$t1 < t2 < t3; \text{ and}$$

$$t3 - t1 \geq 1.0 \text{ (mm)},$$

when numerical apertures required for information reproducing or information recording on the first, second and third optical discs are defined as NA1, NA2 and NA3, respectively, the numerical apertures satisfying a relationship:

$$NA1 > NA2 > NA3,$$

the objective optical system including:
an objective lens; and
a diffraction structure formed on an optical surface in the objective optical system,
the diffraction structure being defined by a following optical path difference function $\phi i(h)$:

$$\phi i(h) = (P_{i2} \times h^2 + P_{i4} \times h^4 + P_{i6} \times h^6 + P_{i8} \times h^8 + P_{i10} \times h^{10} + P_{i12} \times h^{12}) m_i \lambda$$

where $P_{i2}$, $P_{i4}$, $P_{i6}$ ... (i: natural number) represent coefficients of the $2^{nd}$ order, $4^{th}$ order, $6^{th}$ order, ... of i-th optical path difference function, h represents a height from the optical axis, $m_i$ represents a diffraction order at which diffraction efficiency for an incident beam is maximized, and $\lambda$ represents a design wavelength of the incident beam, the diffraction structure including a first area for contributing to converging the third light beam onto a record surface of the third optical disc, the first area including a first step defined by a first optical path difference function and a second step defined by a second optical path difference function, the first step defined by the first optical path difference function being configured such that diffraction orders at which diffraction efficiencies for the first, second and third light beams are maximized are $1^{st}$ order, 0-th order and 0-th order, respectively, the first step defined by the first optical path difference function satisfying a condition:

$$-0.36 \times 10^2 < P_{12} \times f1 + 5.0 \times 10^3 \times (n1 - n3) < 1.80 \times 10^2 \quad (1)$$

where $P_{12}$ denotes a second order coefficient of the first optical path difference function, f1 denotes a total focal length of the objective optical system with respect to the first light beam, n1 denotes a refractive index of the objective lens with respect to the first light beam, and n3 denotes a refractive index of the objective lens with respect to the third light beam, the second step defined by the second optical path difference function being configured such that diffraction orders at which diffraction efficiencies for the first, second and third light beams are maximized are $2^{nd}$ order, $1^{st}$ order and $1^{st}$ order, respectively.

2. The objective optical system according to claim 1, wherein:
the objective optical system includes an optical element separately provided with respect to the objective lens; and
at least one of surfaces of the objective lens and the optical element is formed as the optical surface having the diffraction structure.

3. The objective optical system according to claim 1, wherein at least one of surfaces of the objective lens is formed as the optical surface having the diffraction structure.

4. The objective optical system according to claim 1, wherein the first step defined by the first optical path difference function satisfies a condition:

$$0.12 \times 10^2 < P_{12} \times f1 + 5.0 \times 10^3 \times (n1 - n3) < 1.50 \times 10^2 \quad (2).$$

5. The objective optical system according to claim 1, wherein the diffraction structure is formed by combining at least two types of optical path difference functions including the first and second optical path difference functions such that the diffraction structure is formed on a same optical surface.

6. The objective optical system according to claim 1, wherein:
the diffraction structure includes a second area located outside the first area;
the second area is configured to contribute to converging the first and second light beams onto record surfaces of the first and second optical discs, respectively, and not to contribute to converging the third light beam onto the record surface of the third optical disc;
the second area is defined by at least a single type of optical path difference function; and
the second area is configured such that diffraction order at which diffraction efficiency for the first light beam is maximized is an odd order.

7. The objective optical system according to claim 6, wherein the second area is configured such that the diffraction order at which the diffraction efficiency for the first light beam is maximized is a $5^{th}$ order.

8. The objective optical system according to claim 6, wherein the second area is configured such that the diffraction order at which the diffraction efficiency for the first light beam is maximized is a $3^{rd}$ order.

9. The objective optical system according to claim 6, wherein:
the diffraction structure includes a third area located outside the second area;
the third area is configured to contribute to converging the first light beam onto a record surface of the third optical disc and not to contribute to convergence of each of the second and third light beams;
the third area is defined by at least a single type of optical path difference function; and
the third area is configured such that diffraction order at which diffraction efficiency for the first light beam is maximized is a $1^{st}$ order.

10. An objective optical system used for an optical information recording/reproducing device for recording information to and/or reproducing information from three types of optical discs, by selectively using one of three types of substantially collimated light beams including a first light beam having a first wavelength $\lambda_1$ (nm), a second light beam having a second wavelength $\lambda_2$ (nm) and a third light beam having a third wavelength $\lambda_3$ (nm),
the three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam,
the first, second and third wavelengths $\lambda_1$, $\lambda_2$ and $\lambda_3$ satisfying a condition:

$$\lambda_1 < \lambda_2 < \lambda_3,$$

when protective layer thicknesses of the first, second and third optical discs are represented by t1 (mm), t2 (mm) and t3 (mm), respectively, the protective layer thicknesses satisfy following relationships:

$$t1 < t2 < t3; \text{ and}$$

$$t3 - t1 \geq 1.0 \text{ (mm)},$$

when numerical apertures required for information reproducing or information recording on the first, second and third optical discs are defined as NA1, NA2 and NA3, respectively, the numerical apertures satisfying a relationship:

$$NA1 > NA2 > NA3,$$

the objective optical system including:
an objective lens; and
a phase shift structure which is formed on an optical surface in the objective optical system and includes a plurality of refractive surface zones concentrically formed about a predetermined axis,
the phase shift structure including a first phase shift structure having a first step and a second phase shift structure having a second step,
each of the first step and the second step giving an optical path length difference at a boundary between adjacent ones of the plurality of refractive surface zones,
optical path length differences given by the first and second steps being different from each other,
the phase shift structure including a first area for contributing to converging the third light beam onto a record surface of the third optical disc,
in the first area the phase shift structure satisfying following conditions:

$$-0.92 < \Delta OPD_{11}/\lambda 1 < -0.50 \tag{3};$$

$$-5.00 \times 10^2 < N_{11} \times f1 - 1.25 \times 10^4 (n1-n3) < -0.50 \times 10^2 \tag{4); and}$$

$$1.80 < |\Delta OPD_{21}/\lambda 1| < 2.20 \tag{5},$$

where $\Delta OPD_{11}/\lambda 1$ represents an optical path length difference given by the first step to the first light beam, $\Delta OPD_{21}/\lambda 1$ represents an optical path length difference given by the second step to the first light beam, $N_{11}$ represents a number of first steps, f1 denotes a total focal length of the objective optical system with respect to the first light beam, n1 denotes a refractive index of the objective lens with respect to the first light beam, and n3 denotes a refractive index of the objective lens with respect to the third light beam.

11. The objective optical system according to claim 10, wherein:
the objective optical system including an optical element separately provided with respect to the objective lens; and
at least one of surfaces of the objective lens and the optical element is formed as the optical surface having the phase shift structure.

12. The objective optical system according to claim 10, wherein at least one of surfaces of the objective lens is formed as the optical surface having the phase shift structure.

13. The objective optical system according to claim 10, wherein the phase shift structure in the first area satisfies a condition:

$$-3.50 \times 10^2 < N_{11} \times f1 - 1.25 \times 10^4 (n1-n3) < -1.50 \times 10^2 \tag{6}.$$

14. The objective optical system according to claim 10, wherein the phase shift structure includes at least two types of steps including the first step and the second step such that the first and second steps are formed on a same optical surface.

15. The objective optical system according to claim 10, wherein:
the phase shift structure includes a second area located outside the first area;
the second area is configured to contribute to converging the first and second light beams onto record surfaces of the first and second optical discs, respectively, and not to contribute to converging the third light beam onto the record surface of the third optical disc;

the second area includes a step giving at least a single type of optical path length difference to an incident beam at a boundary between adjacent ones of the adjacent refractive surface zones; and an absolute value of the at least a single type of optical path length difference given by the step in the second area is substantially equal to an odd multiple of the first wavelength $\lambda_1$ of the first light beam.

16. The objective optical system according to claim 15, wherein an absolute value of the at least a single type of optical path length difference given by the step in the second area is substantially equal to $5\lambda_1$.

17. The objective optical system according to claim 15, wherein an absolute value of the at least a single type of optical path length difference given by the step in the second area is substantially equal to $3\lambda_1$.

18. The objective optical system according to claim 15, wherein:

the phase shift structure includes a third area located outside the second area;

the third area is configured to contribute to converging the first light beam onto a record surface of the third optical disc and not to contribute to converging each of the second and third light beams;

the third area includes a step which is located at a boundary between adjacent ones of the plurality of refractive surface zones and give at least a single type of optical length difference to an incident beam;

the at least a single type of optical length difference given by the step in the third area is substantially equal to $\lambda_1$.

19. An optical information recording/reproducing device for recording information to and/or reproducing information from three types of optical discs, by selectively using one of three types of light beams including a first light beam having a first wavelength $\lambda_1$ (nm), a second light beam having a second wavelength $\lambda_2$ (nm) and a third light beam having a third wavelength $\lambda_3$ (nm), the three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam, the first, second and third wavelengths $\lambda_1$, $\lambda_2$ and $\lambda_3$ satisfying a condition:

$\lambda_1 < \lambda_2 < \lambda_3$, when protective layer thicknesses of the first, second and third optical discs are represented by t1 (mm), t2 (mm) and t3 (mm), respectively, the protective layer thicknesses being defined as:

t1≈0.1 mm, t2≈0.6 mm and t3≈1.2 mm, when numerical apertures required for information reproducing or information recording on the first, second and third optical discs are defined as NA1, NA2 and NA3, respectively, the numerical apertures satisfying a relationship:

NA1>NA2>NA3, the optical information recording/reproducing device comprising:

light sources that emits the first, second and third light beams, respectively, coupling lenses that converts the first, second and third light beams into substantially collimated beams, respectively, and an objective optical system, the objective optical system including:

an objective lens; and a diffraction structure formed on an optical surface in the objective optical system, the diffraction structure being defined by a following optical path difference function φi(h):

$$\phi i(h) = (P_{i2} \times h^2 + P_{i4} \times h^4 + P_{i6} \times h^6 + P_{i8} \times h^8 + P_{i10} \times h^{10} + P_{i12} \times h^{12}) m_i \lambda$$

where $P_{i2}$, $P_{i4}$, $P_{i6}$ ... (i: natural number) represent coefficients of the $2^{nd}$ order, $4^{th}$ order, $6^{th}$ order, ... of i-th optical path difference function, h represents a height from the optical axis, $m_i$ represents a diffraction order at which diffraction efficiency for an incident beam is maximized, and $\lambda$ represents a design wavelength of the incident beam, the diffraction structure including a first area for contributing to converging the third light beam onto a record surface of the third optical disc, the first area including a first step defined by a first optical path difference function and a second step defined by a second optical path difference function, the first step defined by the first optical path difference function being configured such that diffraction orders at which diffraction efficiencies for the first, second and third light beams are maximized are $1^{st}$ order, 0-th order and 0-th order, respectively, the first step defined by the first optical path difference function satisfying a condition:

$$-0.36 \times 10^2 < P_{12} \times f1 + 5.0 \times 10^3 \times (n1 - n3) < 1.80 \times 10^2 \quad (1)$$

where $P_{12}$ denotes a second order coefficient of the first optical path difference function, f1 denotes a total focal length of the objective optical system with respect to the first light beam, n1 denotes a refractive index of the objective lens with respect to the first light beam, and n3 denotes a refractive index of the objective lens with respect to the third light beam, the second step defined by the second optical path difference function being configured such that diffraction orders at which diffraction efficiencies for the first, second and third light beams are maximized are $2^{nd}$ order, $1^{st}$ order and $1^{st}$ order, respectively.

20. An optical information recording/reproducing device for recording information to and/or reproducing information from three types of optical discs, by selectively using one of three types of light beams including a first light beam having a first wavelength $\lambda_1$ (nm), a second light beam having a second wavelength $\lambda_2$ (nm) and a third light beam having a third wavelength $\lambda_3$ (nm), the three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam, the first, second and third wavelengths $\lambda_1$, $\lambda_2$ and $\lambda_3$ satisfying a condition:

$\lambda_1 < \lambda_2 < \lambda_3$, when protective layer thicknesses of the first, second and third optical discs are represented by t1 (mm), t2 (mm) and t3 (mm), respectively, the protective layer thicknesses being defined as:

t1≈0.1 mm, t2≈0.6 mm and t3≈1.2 mm, when numerical apertures required for information reproducing or information recording on the first, second and third optical discs are defined as NA1, NA2 and NA3, respectively, the numerical apertures satisfying a relationship:

NA1>NA2>NA3, the optical information recording/reproducing device comprising:
light sources that emits the first, second and third light beams, respectively,
coupling lenses that converts the first, second and third light beams into substantially collimated beams, respectively,
and an objective optical system,
the objective optical system including:
an objective lens; and
a phase shift structure which is formed on an optical surface in the objective optical system and includes a plurality of refractive surface zones concentrically formed about a predetermined axis,
the phase shift structure including a first phase shift structure having a first step and a second phase shift structure having a second step,
each of the first step and the second step giving an optical path length difference at a boundary between adjacent ones of the plurality of refractive surface zones,
optical path length differences given by the first and second steps are different from each other,
the phase shift structure including a first area for contributing to converging the third light beam onto a record surface of the third optical disc,
in the first area the phase shift structure satisfying following conditions:

$$-0.92 < \Delta OPD_{11}/\lambda 1 < -0.50 \quad (3);$$

$$-5.00 \times 10^2 < N_{11} \times f1 - 1.25 \times 10^4 (n1-n3) < -0.50 \times 10^2 \quad (4); \text{ and}$$

$$1.80 < |\Delta OPD_{21}/\lambda 1| < 2.20 \quad (5),$$

where $\Delta OPD_{11}/\lambda 1$ represents an optical path length difference given by the first step to the first light beam, $\Delta OPD_{21}/\lambda 1$ represents an optical path length difference given by the second step to the first light beam, $N_{11}$ represents a number of first steps, f1 denotes a total focal length of the objective optical system with respect to the first light beam, n1 denotes a refractive index of the objective lens with respect to the first light beam, and n3 denotes a refractive index of the objective lens with respect to the third light beam.

* * * * *